(12) United States Patent
Camble et al.

(10) Patent No.: US 8,332,404 B2
(45) Date of Patent: *Dec. 11, 2012

(54) DATA PROCESSING APPARATUS AND METHOD OF PROCESSING DATA

(75) Inventors: Peter Thomas Camble, Bristol (GB); Gregory Trezise, Wells (GB); Mark David Lillibridge, Mountain View, CA (US); Kevin Lloyd Jones, Bristol (GB); Kave Eshghi, Los Altos, CA (US); Vinay Deolalikar, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

This patent is subject to a terminal disclaimer.

(21) Appl. No.: 12/257,659

(22) Filed: Oct. 24, 2008

(65) Prior Publication Data
US 2009/0112945 A1    Apr. 30, 2009

Related U.S. Application Data

(60) Provisional application No. 61/000,426, filed on Oct. 25, 2007.

(51) Int. Cl.
*G06F 17/30* (2006.01)
*G06F 7/00* (2006.01)

(52) U.S. Cl. ........................ 707/736; 707/744

(58) Field of Classification Search ............. None
See application file for complete search history.

(56) References Cited

U.S. PATENT DOCUMENTS

| | | | |
|---|---|---|---|
| 5,638,509 A | 6/1997 | Dunphy | |
| 5,990,810 A | 11/1999 | Williams | |
| 6,122,626 A * | 9/2000 | Brandsma | 1/1 |
| 6,513,050 B1 | 1/2003 | Williams | |
| 6,839,680 B1 | 1/2005 | Liu | |
| 6,938,005 B2 * | 8/2005 | Iverson et al. | 705/26.41 |
| 6,961,009 B2 | 11/2005 | McCanne | |
| 7,082,548 B2 | 7/2006 | Nakano | |
| 7,269,689 B2 | 9/2007 | Eshghi | |
| 2001/0010070 A1 | 7/2001 | Crockett | |
| 2001/0011266 A1 * | 8/2001 | Baba | 707/1 |

(Continued)

FOREIGN PATENT DOCUMENTS

WO    2006030326 A1    3/2006

(Continued)

OTHER PUBLICATIONS

Fenstermacher et al., "Mining Client-Side Activity for Personalization" Department of Management Information Systems, Eller College of Business and Public Administration, University of Arizona, Jun. 2002 (8 pages).

(Continued)

*Primary Examiner* — Hosain Alam
*Assistant Examiner* — Yu Zhao

(57) ABSTRACT

Data processing apparatus comprising: a chunk store containing specimen data chunks, a manifest store containing a plurality of manifests, each of which represents at least a part of a data set and each of which comprises at least one reference to at least one of said specimen data chunks, a sparse chunk index containing information on only some specimen data chunks, the processor being operable to: process input data into input data chunks; identify manifests having at least one reference to one of said specimen data chunks that corresponds to one of said input data chunks and on which there is information contained in the sparse chunk index; and prioritize the identified manifests for subsequent operation.

23 Claims, 7 Drawing Sheets

U.S. PATENT DOCUMENTS

| | | | |
|---|---|---|---|
| 2002/0156912 A1* | 10/2002 | Hurst et al. | ............ 709/236 |
| 2002/0169934 A1 | 11/2002 | Krapp | |
| 2003/0101449 A1 | 5/2003 | Bentolila | |
| 2003/0140051 A1 | 7/2003 | Fujiwara | |
| 2004/0162953 A1 | 8/2004 | Yoshida | |
| 2005/0091234 A1 | 4/2005 | Hsu | |
| 2005/0131939 A1* | 6/2005 | Douglis et al. | ............ 707/103 Y |
| 2006/0059171 A1 | 3/2006 | Borthakur | |
| 2006/0059173 A1 | 3/2006 | Hirsch | |
| 2006/0059207 A1 | 3/2006 | Hirsch | |
| 2006/0293859 A1 | 12/2006 | Pipke | |
| 2007/0220197 A1 | 9/2007 | Lasser | |
| 2007/0250519 A1 | 10/2007 | Fineberg | |
| 2007/0250670 A1 | 10/2007 | Fineberg | |
| 2007/0255758 A1 | 11/2007 | Zheng | |
| 2008/0126176 A1 | 5/2008 | Iguchi | |
| 2008/0294696 A1 | 11/2008 | Frandzel | |
| 2009/0019246 A1 | 1/2009 | Murase | |
| 2009/0112946 A1 | 4/2009 | Jones | |
| 2009/0113167 A1 | 4/2009 | Camble | |
| 2010/0198792 A1 | 8/2010 | Camble | |
| 2010/0198832 A1 | 8/2010 | Jones | |
| 2010/0205163 A1 | 8/2010 | Eshghi | |
| 2010/0235372 A1 | 9/2010 | Camble | |
| 2010/0235485 A1 | 9/2010 | Lillibridge | |
| 2010/0246709 A1 | 9/2010 | Lillibridge | |
| 2010/0280997 A1 | 11/2010 | Lillibridge | |
| 2010/0281077 A1 | 11/2010 | Lillibridge | |
| 2011/0040763 A1 | 2/2011 | Lillibridge | |

FOREIGN PATENT DOCUMENTS

| | | | |
|---|---|---|---|
| WO | 2006094365 A1 | 9/2006 | |
| WO | 2006094366 A1 | 9/2006 | |
| WO | 2006094367 A1 | 9/2006 | |
| WO | 2007127248 A2 | 11/2007 | |
| WO | 2009054828 A1 | 4/2009 | |
| WO | 2009131585 A1 | 10/2009 | |

OTHER PUBLICATIONS

Baoyao, Zhou, "Intelligent Web Usage Mining" Nanyang Technological University, Division of Information Systems, School of Computer Engineering, 2004 (94 pages).

Baynote Inc.: The Collective Intelligence Platform, Online, http://www.baynote.com/technology/platform/2010 (1 page).

Hottolink Inc., "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

Shankar et al., ""Personalized Web Search Based on Client Side Ontology"", CS 498: B.Tech Project,10. IIT Kanpur, India 2010 (9 pages).

Sendhikumar et al., "Personalized ontology for web search personalization" Anna University, Chennai, India , 2008 (7 pages).

Shahabi et al., "Yoda an Accurate and Scalable Web based Recommendation System?" University of SouthernCalifornia, Los Angeles, Sep. 2001 (14 pages).

Claypool et al., "Implicit Interest Indicators", Worcester Polytechnic Institute, Worcester, Computer Science Department Worcester Polytechnic Institute Worcester, MA 01609, USA., 2001 (8 pages).

Shahabi et al., A Framework for Efficient and Anonymous Web Usage Mining Based on Client-Side Tracking, University of Southern California, Los Angeles, 2002 (48 pages).

Clattertrap, Online http://www.clattertrap.com, Jul. 20, 2010 (1 page).

HSNW: SRI defense technology spawns civilian application: published Jun. 29, 2010 (2 pages).

Anthony Ha: Facebook investor backs Chattertrap, a personal assistant for content, Jun. 28, 2010 (6 pages).

U.S. Appl. No. 11/411,467, Non-Final Rejection dated Jan. 27, 2009 (pp. 1-9 and attachments).

U.S. Appl. No. 11/411,467, Final Rejection dated Aug. 11, 2009 (pp. 1-11 and attachment).

U.S. Appl. No. 11/411,467, Examiner's Answer dated May 11, 2010 (pp. 1-11 and attachment).

Muthitacharoen Athicha, et al., "A Low-Bandwidth Network File System," Proceedings of the 18th ACM Symposium on Operating Systems Principles (SOSP '01), Oct. 2001.

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.

Eshghi et al., "Jumbo Store: Providing Efficient Incremental Upload and Versioning for a Utility Rendering Service," 2007 (16 pages).

U.S. Appl. No. 10/870,783, Non-Final Rejection dated Dec. 15, 2006, pp. 1-4 and attachments.

U.S. Appl. No. 10/870,783, Notice of Allowance dated Jun. 13, 2007 (7 pages).

Brin, Sergey, et al., "Copy Detection Mechanisms for Digital Documents", Department of Computer Science, Stanford University, Oct. 31, 1994, p. 1-12.

Manber, Udi, "Finding Similar Files in a Large File System," Department of Computer Science, University of Arizona, TR 93-33, Oct. 1993, (11 pages).

Rabin, M.O., "Fingerprinting by Random Polynomials," Technical Report, Center for Research in Computing Technology, Harvard University, 1981, Report TR-15-81 (14 pages).

U.S. Appl. No. 12/256,329, Non-Final Rejection dated May 25, 2011, pp. 1-17 and attachment.

U.S. Appl. No. 12/988,365, Non-Final Rejection dated Jun. 27, 2012, pp. 1-10 and attachments.

* cited by examiner

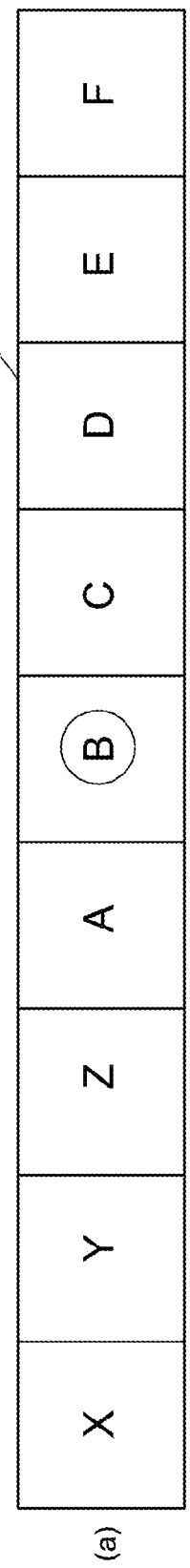
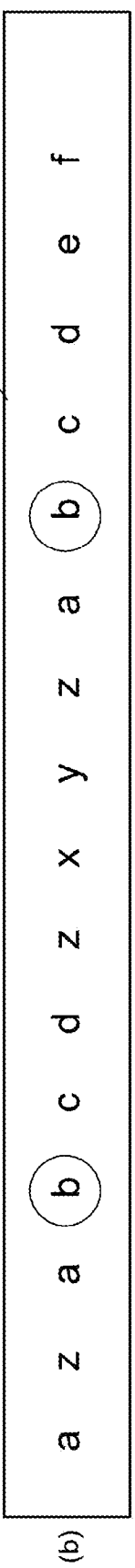
FIG. 5

DATA PROCESSING APPARATUS AND METHOD OF PROCESSING DATA

CROSS-REFERENCE TO RELATED APPLICATION

This Utility Patent Application is based on and claims the benefit of U.S. Provisional Application No. 61/000,426, filed on Oct. 25, 2007 the contents of which are hereby incorporated by reference in their entirety.

BACKGROUND OF THE INVENTION

Data held on a primary data storage medium may be backed-up to secondary data storage medium. The secondary data storage medium may be in a different location to the primary data storage medium. Should there be at least a partial loss of the data on the primary data storage medium, data may be recovered from the secondary data storage medium. The secondary data storage medium may contain a history of the data stored on the primary data storage medium over a period of time. On request by a user, the secondary data storage medium may provide the user with the data that was stored on the primary data storage medium at a specified point in time.

Data back-up procedures may be carried out weekly, daily, hourly, or at other intervals. Data may be backed-up incrementally, where only the changes made to the data on the primary data medium since the last back-up are transferred to the secondary data storage medium. A full back-up may also be performed, where the entire contents of the primary data medium are copied to the secondary data medium. Many other back-up strategies exist.

When backing-up data, a particular part of the data being backed-up may have previously been stored to the primary data storage medium, which may especially be the case when full back-ups are carried out. Storing the same data numerous times represents an inefficient use of a data storage medium.

SUMMARY OF THE INVENTION

One embodiment of the present invention provides data processing apparatus comprising:
  a chunk store containing specimen data chunks,
  a manifest store containing a plurality of manifests, each of which represents at least a part of a data set and each of which comprises at least one reference to at least one of said specimen data chunks,
  a sparse chunk index containing information on only some specimen data chunks,
  the processor being operable to: process input data into input data chunks; identify manifests having at least one reference to one of said specimen data chunks that corresponds to one of said input data chunks and on which there is information contained in the sparse chunk index; and prioritize the identified manifests for subsequent operation.

In one embodiment, the data processing apparatus is operable to prioritize the identified manifests for subsequent operation according to the number of corresponding specimen data chunks upon which there is information contained in the sparse chunk index each references.

In one embodiment, the data processing apparatus is operable to prioritize the identified manifests in descending order of the number of references each contains to specimen data chunks on which there is information contained in the sparse chunk index and which correspond to input data chunks.

In one embodiment, the data processing apparatus is to prioritize the identified manifests according to, at least in part, when each identified manifest was added to the manifest store.

In one embodiment, for a specimen data chunk, the sparse chunk index contains information of at least one manifest in the manifest store comprising a reference to said specimen data chunk.

In one embodiment, for a specimen data chunk indexed by the sparse chunk index, the sparse chunk index contains information on only the most recent R manifests added to the manifest store that comprise a reference to said specimen data chunk.

In one embodiment, said subsequent operation is to identify, in at least one said prioritized manifest, references to specimen data chunks corresponding to input data chunks of the input data set upon which information is not contained in the sparse chunk index.

In one embodiment, the data processing apparatus is operable to re-prioritize the identified manifests during subsequent operation on the identified manifests.

In one embodiment, the data processing apparatus is operable to process each prioritized manifest, in turn, while a predetermined condition of a preceding given manifest has been met.

In one embodiment, the data processing apparatus is operable to store an input data chunk in the chunk store as a specimen data chunk, should it fail to determine that a specimen data chunk corresponding to that input data chunk exists in the chunk store.

In one embodiment, the data processing apparatus is operable to remove information from the sparse index according to at least one predetermined criterion.

In one embodiment, the data processing apparatus is operable to remove information from the sparse chunk index according to at least one predetermined criterion.

In one embodiment, at least one predetermined criterion is based on when a specimen data chunk to which the information entered in the sparse chunk index relates was added to the chunk store.

In one embodiment, the at least one predetermined criterion is based on the number of times a specimen data chunk to which information entered in the sparse chunk index relates has corresponded to an input data chunk.

In another embodiment, the present invention provides data processing apparatus operable to prioritize manifests that include at least one reference to a specimen data chunk in a chunk store corresponding to at least one input data chunk that has information about it contained in a sparse chunk index and that belongs to an input data set, the processor further being operable to:
  prioritize the identified manifests for subsequent operation according to the number of said corresponding specimen data chunks referenced by each of them.

In one embodiment, the data processing apparatus is operable to re-prioritize the manifests.

In another embodiment, the present invention provides a data processor comprising:
  a chunk store containing specimen data chunks,
  a manifest store containing manifests, each of which represents at least a part of a data set and comprise at least one reference to at least one of said specimen data chunks,
  a sparse chunk index containing information on only some specimen data chunks,
  the processor being operable to: process input data into input data chunks; identify at least one manifest having at least one reference to one of said specimen data chunks that corresponds to one of said input data chunks and on which there is information contained in the sparse chunk index; and prioritize the identified manifests for subsequent operation, the data processing apparatus being operable subsequently to manage the information contained in the sparse chunk index.

In another embodiment, the present invention provides a method of processing data, using:

a chunk store containing specimen data chunks;

a manifest store containing manifests representing at least a part of a data set, each manifest comprising at least one reference to at least one of said specimen data chunks; and a sparse chunk index containing information on only some specimen data chunks, the method comprising:

processing input data into input data chunks;

identifying and prioritising manifests having at least one reference to one of said specimen data chunks that corresponds to one of said input data chunks and on which there is information contained in the sparse chunk index.

In another embodiment, the method further comprises:

processing each prioritized manifest, in turn, to identify references to specimen data chunks corresponding to input data chunks of the input data set that do not have information about them contained in the sparse chunk index.

In another embodiment, the present invention provides a method of data processing, comprising:

identifying manifests which include at least one reference to a specimen data chunk in a chunk store corresponding to at least one input data chunk that has information about it contained in a sparse chunk index and that belongs to an input data set; and prioritising the identified manifests for subsequent operation according to the number of corresponding specimen data chunks referenced therein.

BRIEF DESCRIPTION OF THE DRAWINGS

Embodiments of the invention will now be described, by way of example only, with reference to the accompanying drawings, in which:

FIG. 5 shows a schematic representation of a data set and a manifest;

DETAILED DESCRIPTION

Figure 1:
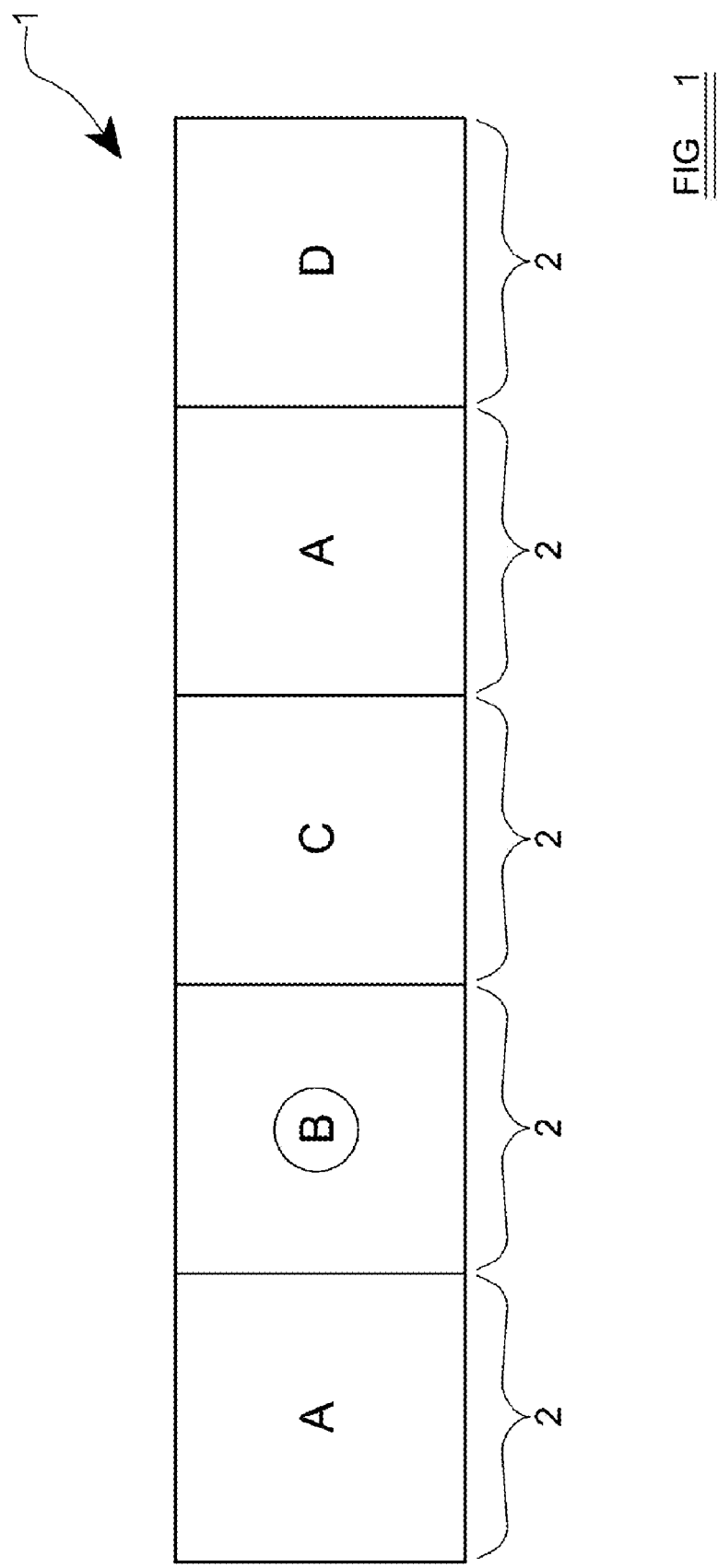
FIG. 1 shows a schematic representation of a data set.

FIG. 1 shows a schematic representation of a data set 1. A data set 1 may be shorter or longer than that shown in FIG. 1. A data set 1 comprises an amount of data, which may be in the order of 10 bytes, 1000 bytes, 10 KB or many megabytes or terabytes. A data set may represent all the data for a given back-up operation, or at least a part of a larger data set.

A back-up data set may comprise a continuous data stream or a discontinuous data stream. Whichever, the data set may contain many distinct, individual files or parts of files. The data set may not be partitioned into the individual files it contains. The data set may contain embedded information, comprising references to the boundaries of the individual files contained in the data set. The data set may then more easily be dissected into its constituent components. The size of the embedded information may represent a significant portion of the total data. Backing-up data with embedded file information increases the required capacity of the data storage medium.

Data processing apparatus according to an embodiment is operable to process an input data set into one or more input data chunks. An input data set may be divided into a plurality of input data chunks. Each input data chunk may represent an individual file, a part of an individual file, a group of individual files within the input data set, or several individual files plus parts of several others. The data set may be processed into input data chunks based on properties of the input data as a whole, with little or no regard to the individual files contained therein. The boundaries of data chunks may or may not be coterminous with file boundaries. The data chunks may be identical or varying in size.

FIG. 1 illustrates a schematic representation of an input data set 1 processed into data chunks 2. For convenience, each unique input data chunk is labelled in FIG. 1 from A-D. For the purposes of this application, when determining whether a chunk is unique we consider only its contents (i.e., the byte sequence in the data set 1 it was created from), not its position or location in an input data set. Note that for this example the first and fourth chunks in the data set 1 have the same content and are thus assigned the same label. Duplicated data in the data set 1 may give rise to repeated input chunks 2. The input data set 1 may be divided into more or different input data chunks 2 than those shown in FIG. 1. An input data set 1 may be many terabytes in size, and be processed into billions of input data chunks. There are specific schemes available to the skilled person to determine how the input data set 1 is processed into input data chunks 2 and which information each input data chunk 2 contains.

Figure 2:
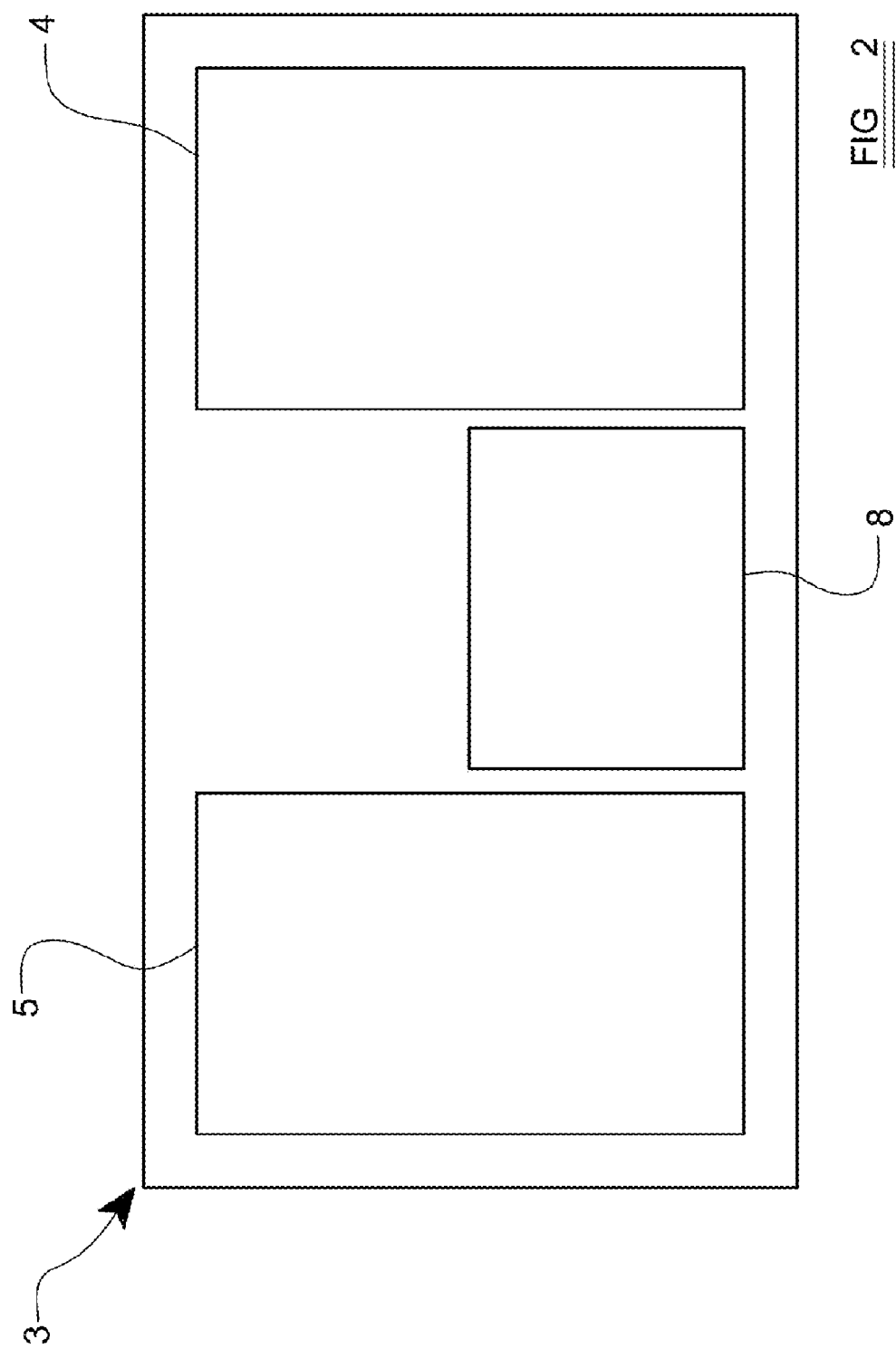
FIG. 2 shows a schematic representation of data processing apparatus according to an embodiment of the present invention.

FIG. 2 shows data processing apparatus 3 (including at least one processor) according to an embodiment. The data processing apparatus 3 comprises a chunk store 4, a manifest store 5 and sparse chunk index 8. The manifest store 5 may be discrete from, and separate to, the chunk store 4 but both stores 4, 5 may reside on a common data storage medium or memory device. In the example shown in FIG. 2, the chunk store 4, manifest store 5 and sparse chunk index 8 do not contain any data or information. How the data and information are populated in each of the chunk store 4, manifest store 5 and sparse chunk index 8 will now be described.

Figure 3:
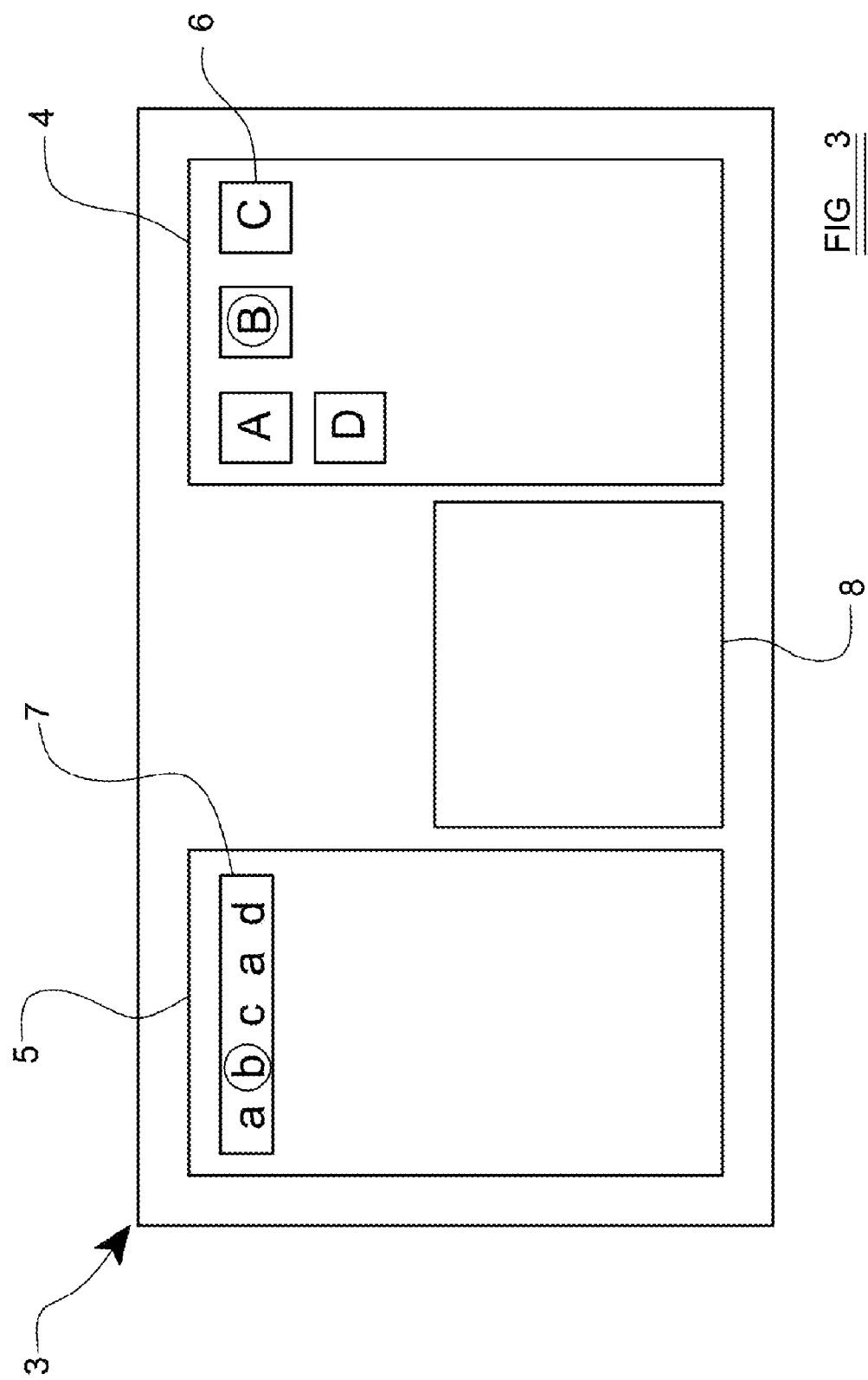
FIG. 3 shows a schematic representation of the data processing apparatus of FIG. 2, in use.

As an input data set 1 is processed by data processing apparatus 3, each input data chunk 2 is stored to the chunk store 4 as a specimen data chunk 6 if the data processing apparatus 3 determines that a corresponding specimen data chunk 6 is not already present, as shown in FIG. 3. It will be appreciated, in this example, that since the input data set 1 is the first to be processed, all the unique input data chunks will be added to the chunk store 4 as specimen data chunks 6 (i.e. one of each of B, C and D but only one of the two occurrences of input data chunk A). However, in subsequent operations, it may be determined that an input data chunk is already present in the chunk store 4 as a specimen data chunk 6; in which case no new additions to the chunk store 4 may be made.

A specimen data chunk 6 may be a carbon copy of an input data chunk 2. Alternatively, a specimen data chunk 6 may be a transformed copy of the corresponding input data chunk 2; for example, it may be an encrypted and/or compressed version of input data chunk 2 or have additional headers or metadata added. An input data chunk 2 and a specimen chunk 6 may be considered to correspond if they contain the same contents. (The contents of an encrypted chunk are the corresponding unencrypted data.)

Note that although there are two input data chunks with contents A, only one specimen data chunk 6 with contents A is shown as stored to chunk store 4 in FIG. 3. This is because we have assumed for this example that the data processing apparatus determines when it reaches chunk four that it already has a corresponding specimen data chunk 6 in the chunk store 4 (added when chunk one was processed). The determining procedure may occasionally make mistakes, determining that a chunk is not present when it actually is, leading to some specimen data chunks 6 being added to the chunk store 4 multiple times. Occasional duplication may be permitted. The chunk store 4 may store a plurality of specimen data chunks 6.

In one embodiment, both the chunk store 4 and manifest store 5 are stored in high latency, non-volatile, storage, such as disk. The sparse chunk index 8 may be stored on low latency, volatile, storage, such as RAM.

As an input data chunk 2 is processed, a manifest 7 is compiled. A manifest 7 is a representation of a data set 1. The manifest 7 comprises references to specimen data chunks 6 in the chunk store 4 which correspond to the input data chunks 2 comprising the input data set 1. So, the references of the manifest 7 may be seen as metadata to specimen data chunks 6. If the references to specimen data chunks 6 of a given manifest 7 are smaller in size than the specimen data chunks 6 referred to by the manifest 7, then it will be appreciated that a manifest 7 may be smaller in size than the input data set 1 it represents. As more and more manifests are added to the manifest store 5, which manifests reference specimen data chunks already stored in the chunk store 4, the total combined size of the manifests and specimen data chunks may be smaller than the total combined size of the data sets the manifests represent because duplicated input chunks may be stored only once each.

When an input data set 1 has been processed into input data chunks 2 and a manifest 7 compiled, representing the input data set 1, the manifest 7 is stored in the manifest store 5, as shown schematically in FIG. 3. Here we represent a reference to a specimen data chunk 6 with content X (there will usually only be one) using the corresponding lowercase letter x.

If a user of data processing apparatus 3 wishes to recover the data of a given input data set 1—which may relate to a back-up made at a particular point in time—the apparatus will retrieve the corresponding manifest 7 from the manifest store 5. Each reference in the manifest 7 to specimen data chunks 6 in the chunk store 4 is then used to reconstruct the original data set 1.

Populating the Sparse Chunk Index: Chunk Identifiers

As each input data chunk 2 is processed, the sparse chunk index 8 may be populated with information on only some of the specimen data chunks 6 that correspond to input data chunks 2. In one embodiment, the 'some' specimen data chunks may be chosen according to whether they have a predetermined characteristic. For a given number of specimen data chunks in the chunk store, there may be no information in the sparse chunk index. In another embodiment, if none of these specimen data chunks 6 have the predetermined characteristic, no information will be added to the sparse chunk index 8. The 'sparsity' of the sparse chunk index 8 arises as a result of the index containing information on only some specimen data chunks 6 (e.g. those having the predetermined characteristic) and not containing information on other specimen data chunks 6 (e.g. those not having the predetermined characteristic). For a given number of specimen data chunks 6 stored in the chunk store 4, there will thus usually be a smaller number of specimen data chunks 6 about which the sparse chunk index 8 contains information.

In one embodiment, a data processing apparatus is operable to generate a chunk identifier of an input data chunk. A chunk identifier may be a digital fingerprint of the data chunk to which it relates. The chunk identifier may be a unique chunk identifier, being unique for a particular data chunk. The algorithm for generating chunk identifiers may be selected so as to be capable of generating unique chunk identifiers for a predetermined number of data chunks. In one embodiment, the chunk identifier is generated using the SHA1 hashing algorithm. Other hashing algorithms may be used, such as SHA2 or MDA5. In one embodiment, the hashing algorithm is selected and configured such that it is substantially computationally infeasible to find two different data chunks that would produce the same chunk identifier. Thus, given the number of specimen data chunks 6 that it may be possible to add to the chunk store 4 in practice due to chunk store 4 size limitations, it may be extremely unlikely that two of the added chunks 6 may share the same chunk identifier.

In one embodiment, the chunk identifier of an input data chunk is the same as the chunk identifier of the corresponding specimen data chunk 6. This may be achieved by having the chunk identifier depend only on the given chunk's contents. In one embodiment, the sparse chunk index 8 contains information on only the specimen data chunks 6 having a chunk identifier with a predetermined selection characteristic. In one example, the selection characteristic may be that N adjacent bits of the chunk identifier are of a predetermined bit value.

In one embodiment, the algorithm for generating chunk identifiers is chosen so as to generate a unique chunk identifier for every possible specimen data chunk likely to be added to the chunk store 4. Thus, a 4-bit chunk identifier, having only 16 possible values, should not be chosen where more than 16 different specimen data chunks are likely to be added to the chunk store 4. Otherwise, two different specimen data chunks may be assigned the same chunk identifier. In one embodiment, the number of possible chunk identifier values is much larger than the likely number of unique specimen data chunks to be stored in the chunk store 4. In this embodiment, the risk of a collision (where the same chunk identifier is generated from two different specimen data chunks) may be reduced.

The above embodiment makes a selection of the specimen data chunks 6 based on a property of their chunk identifiers and not directly on the specimen data chunks 6 themselves. In an embodiment where chunk identifiers depend only on the contents of the given chunk, this means that there is no regard given to the location of the specimen data chunk 6 in the chunk store 4, or the order in which the specimen data chunks 6 were added to the chunk store.

In one embodiment, the information contained in the sparse chunk index 8 on some specimen data chunks 6 includes the chunk identifier of each of those specimen data chunks 6.

In some embodiments, part of the chunk identifier may be stored in the sparse chunk index 8 implicitly. That is, the location of the remaining part of the chunk identifier may implicitly specify the first part. For example, it is common in hash tables (the sparse chunk index 8 may be implemented as a hash table) for the first few bits of a key to specify which slot of the hash table information about that key is stored in; because every item in that slot has a key with the same first few bits, there is no need to explicitly store those bits.

In one embodiment, only a partial chunk identifier may be stored in the sparse chunk index 8. Thus, two different specimen data chunks may have the same partial chunk identifier. A disadvantage of storing only partial chunk identifiers is that the data processing apparatus may choose manifests poorly based on the misleading (partial) information in the sparse chunk index 8, leading to poorer deduplication (e.g., duplicate copies of unique specimen data chunks 6 will exist in the chunk store 4). The apparatus may thus assume, by referring to the partial chunk identifiers in the chunk index 8, that a specimen data chunk corresponds to an input data chunk 2 being processed, even though they may be different.

However, embodiments of the present invention may include a verification step, described later. Such a verification step may discount specimen data chunks which do not correspond to an input data chunk 2, despite their respective partial chunk identifiers indicating that they correspond. An advantage of storing only partial chunk identifiers is that the size of the sparse chunk index 8 is reduced still further. This benefit is in addition to reduction in size of the sparse chunk index 8 as a result of only storing information on some specimen data chunks 6.

In one embodiment, the information contained in the sparse chunk index 8 for a specimen data chunk 6 includes a reference to every manifest 7 which is in the manifest store 5 and includes a reference to that specimen data chunk 6. That is, for each specimen data chunk 6 having an entry in the sparse chunk index 8, there is stored a list of manifests 7 in the manifest store 5 which contain at least one reference to that specimen data chunk 6. In another embodiment, there may be stored only a partial list of the manifests 7 in the manifest store 5 which contain at least one reference to that specimen data chunk. Thus, although there may be many manifests stored in the manifest store which include a reference to a specimen data chunk 6 having an entry in the sparse chunk index 8, the sparse chunk index 8 may only contain details on a limited number of those manifests.

In use, the manifest store 5 may contain many manifests 7, each representing a previously processed data set 1. In one embodiment, the manifest store 5 contains information relating to each manifest 7 contained therein. The information may include the properties associated with each manifest 7; such as its size, the number of references it contains or the name and other details of the data set which it represents. The information for a particular manifest may include a chunk identifier of at least one of the specimen data chunks 6 referenced by the manifest 7

Deduplication: Hooking

In one embodiment, data processing apparatus 3 uses the sparse chunk index 8 and an identified manifest 7 in an attempt to identify which input data chunks 2 of an input data set already have corresponding specimen data chunks 6 in the chunk store 4. As a consequence, in one extreme embodiment, there may be stored only one copy of each unique specimen data chunk 6, regardless of how may times input data chunks corresponding to that specimen data chunk 6 appear in input data sets being processed. The process of eliminating, or at least reducing, the multiple storage of data is called deduplication (sometimes also referred to as compaction). We describe two methods of doing this in this application, which we call hooking (preferred) and zipping, but our invention is not limited to these. We will first describe how the data processing apparatus 3 works when using hooking, then will describe how things differ when using zipping.

Figure 4:
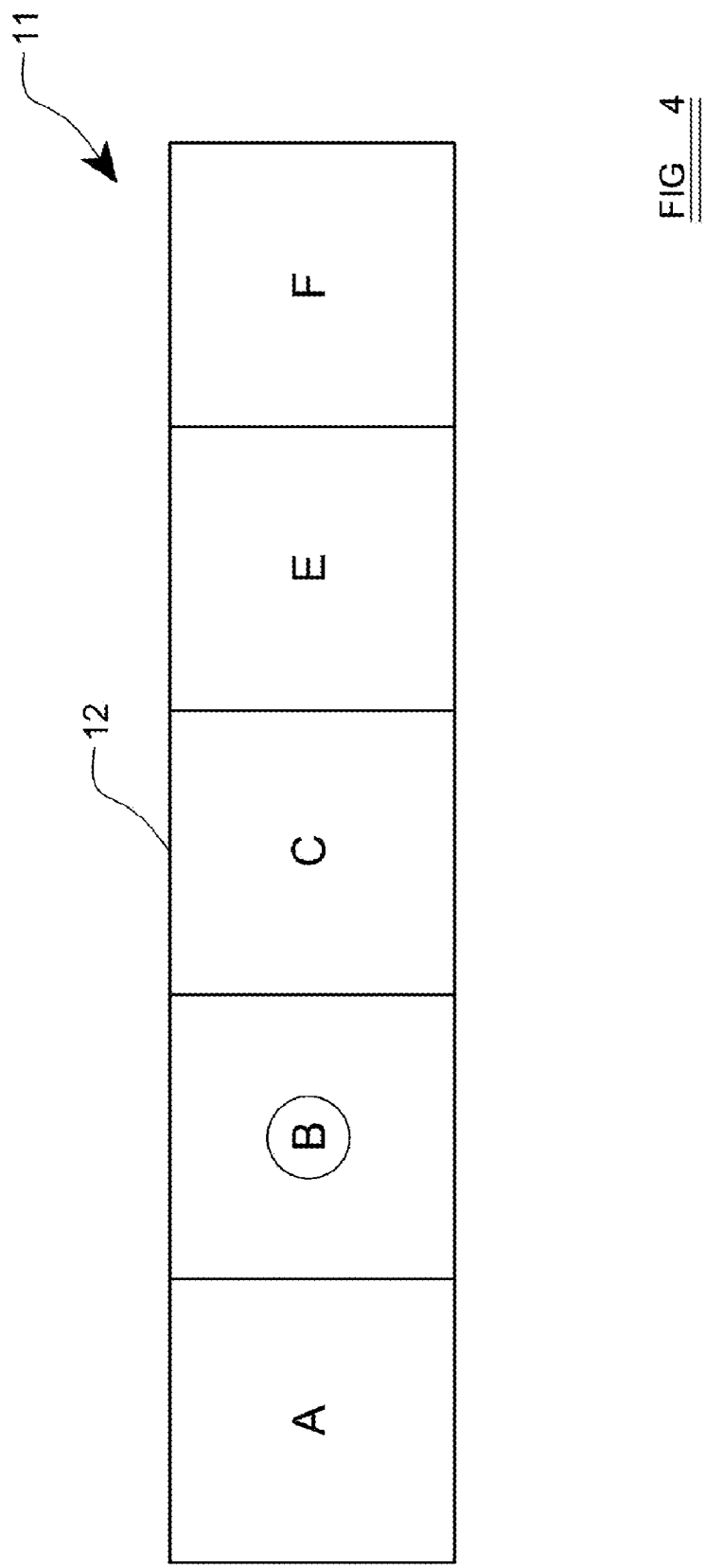
FIG. 4 shows a schematic representation of another data set.

A schematic representation of a second input data set 11 to be subsequently processed is illustrated in FIG. 4. Without data processing apparatus 3, the second input data set 11 may be stored in its entirety. Thus, even though it can be seen by the reader that both input data sets 1, 11 comprise the common input data chunks A, B and C, both occurrences of each would be stored, which is an inefficient use of a data storage medium. How the data processing apparatus is operable to reduce the duplication of data will now be described.

With data processing apparatus 3, when the input data set 11 is presented to the data processing apparatus 3, the input data set 11 is processed into input data chunks 12. The data processing apparatus 3 is operable to use the sparse chunk index 8 to identify at least one manifest 7 in the manifest store 5 that includes at least one reference to a specimen data chunk 6 corresponding to at least one of the input data chunks 12 of the second input data set 11 having said predetermined characteristic, as described below (pages 21, 36)

As shown in FIG. 3, before processing the input data set 11 shown in FIG. 4, the chunk store 4 contains specimen data chunks A, B, C and D, which represent each of the input data chunks 2 in the input data set 1 shown in FIG. 1. (A represents two input data chunks 2.) In addition, the manifest store 5 includes a manifest 7 representative of input data set 1, comprising references to each of the specimen data chunks 6 stored in the chunk store 4. The input data set 1 of FIG. 1 may be rebuilt using the manifest 7 in the manifest store 5 and the specimen data chunks 6 in the chunk store 4.

In addition, the sparse chunk index 8 is configured for containing information on only some specimen data chunks 6

Suppose, for this example, that of the specimen data chunks A, B, C and D, only specimen data chunk B has an entry in the sparse chunk index. We indicate the selected specimen data chunk (on which information is stored in the sparse chunk index) by using a circle, in FIGS. 1 and 3. None of the specimen data chunks A, C or D has an entry in the sparse chunk index. Thus, the sparse chunk index 8 may contain information only on specimen data chunk B. In one embodiment, the information may comprise the chunk identifier, or partial chunk identifier, of specimen data chunk B and further at least a partial list of manifests in the manifest store which comprise a reference to specimen data chunk B—in another embodiment, there may be a full list of manifests. In the example shown in FIG. 3, there is only one manifest currently contained in the manifest store. Thus, in the sparse chunk index 8, against the entry for specimen data chunk B, there will be stored a reference to the manifest 7 stored in the manifest store 5.

Data processing apparatus 3, on receiving the input data set 11 of FIG. 4, is operable to divide the input data set 11 into input data chunks 12. For each input data chunk 12, a chunk identifier is generated. Each of the chunk identifiers generated may be compared with all of the entries in the sparse chunk index, to find a specimen data chunk corresponding to an input data chunk. It will be seen that input data set 11 includes input data chunk B, which corresponds to specimen data chunk B As a result of comparing the chunk identifiers of the input data chunks with the chunk identifier stored in the sparse chunk index 8, it may be determined that there exists a specimen data chunk 6 in the chunk store 4 corresponding to input data chunk B. From the sparse chunk index 8, the data processing apparatus will identify, from the sparse chunk index 8, a list of manifests containing references to specimen data chunk B. Each searched for input data chunk 12 may give rise to a list of manifests, which are then combined into a single list where each manifest is listed at most once. Where partial chunk identifiers are used in the sparse chunk index 8, a larger list of manifests may be returned, since some manifests may have been incorrectly returned as having a reference to a specimen data chunk corresponding to an input data chunk, as a result of using partial chunk identifiers. Where at least one manifest is returned, the at least one manifest may be utilized by the data processing apparatus to compact a data set (i.e. eliminate or reduce duplicates).

Some embodiments of the present invention further provides for the prioritisation of identified manifests, as explained later.

Accordingly, the manifest 7 already stored in the manifest store will be identified by the data processing apparatus. The data processing apparatus is operable to analyse the returned manifests in order to make a determination of which input data chunks are already present in chunk store 4. In some embodiments, only a subset of the returned manifests may be so analyzed. In one embodiment, the data processing apparatus is operable to review the returned at least one manifest and identify at least one reference to a specimen data chunk 6 corresponding to at least one other input data chunk of the input data set 11. For example, there may be identified references to specimen data chunks 6 corresponding to further input data chunks of the input data set.

In one embodiment, each input data chunk 12 of the input data set 11 is compared with each specimen data chunk 6 referenced by the returned manifests 7. It should be appreciated that, having identified these manifests, the data processing apparatus is operable to compare each and every input data chunk 12 of the input data set 11 with each and every specimen data chunk referenced by the identified manifests, not just the input data chunks 12 which may correspond to specimen data chunks on which there is information contained in the sparse chunk index.

In one embodiment, the full chunk identifier of each input data chunk 12 may be compared with the full chunk identifiers of each specimen data chunk 6 referenced in the identified manifests. In one embodiment, described above, the manifest may contain the chunk identifier for each specimen data chunk 6 referenced by the manifest. Accordingly, the comparison step may be performed by using only the information contained in a returned manifest and the chunk identifiers generated for the input data set 12. A benefit of this is there may be no need to refer to the sparse chunk index 8 or the chunk store 4 for further information.

With the example shown in FIG. 4, by comparing each of the input data chunks 12 of the input data set 11 with the specimen data chunks 6 referenced by the returned manifests, it may be determined that input data chunks A, B, and C have corresponding specimen data chunks A, B, and C already stored in the chunk store 4. In one embodiment, it will be determined that the chunk identifiers of input data chunks A, B, and C are identical to the chunk identifiers contained in the manifest, which references corresponding specimen data chunks A, B, and C in the chunk store 4.

In any event, the data processing apparatus may determine that specimen data chunks 6 corresponding to input data chunks A, B, and C of input data set 11 already exist. Accordingly, specimen data chunks corresponding to input data chunks A, B, and C of input data set 11 need not be stored again in the chunk store 4.

A data processor according to an embodiment is operable to compile a manifest for the input data set 11. As described above with reference to the example shown in FIG. 4, it has been determined that the chunk store 4 already contains specimen data chunks A, B and C, which correspond to input data chunks A, B and C. A manifest for the input data set 11 may therefore be compiled with references to those specimen data chunks 6. A benefit of this is that a portion of the manifest for input data set 11 has already been compiled, without any further specimen data chunks 6 having been added to the chunk store 4. There is thus no duplication of data in the chunk store 4. The 'footprint' of storing the first 1 and second 11 input data sets using the data processing apparatus may be smaller than the footprint of storing the first 1 and second 11 input data sets without using the data processing apparatus according to an embodiment.

Another benefit of the above described embodiment is that the manifest was identified from just one input data chunk 12 matching a specimen data chunk in the chunk store 4 in this case. The operation of some embodiments using hooking can be thought of, conceptually, as attaching hooks to manifests at each reference to a specimen data chunk on which the sparse chunk index contains information. Thus, when a data set is processed, manifests which reference specimen data chunks corresponding to an input data chunk and on which there is information contained in the sparse chunk index are "pulled in" for analysis. The more hooks of a given manifest that match, the more likely it is to be 'pulled in' and, as a result of having more 'hooks', the more useful it likely is for deduplication.

As the new manifest is compiled, representative of input data set 11, information on the manifest may be added to the sparse chunk index 8. This is because the new manifest comprises a reference to specimen data chunk B. Accordingly, the sparse chunk index 8 may be updated to record that both of the manifests 7 (the existing manifest and the new manifest for input data set 11) in the manifest store comprise references to specimen data chunk B.

It will be noted that input data set 11 also contains input data chunks E and F. The data processing apparatus is operable to add input data chunks E and F to the chunk store 4, as specimen data chunks 6, should they not already exist in the chunk store. One possibility is that specimen data chunks E and F do exist in the chunk store, but because the identified manifest did not contain references to them, the data processing apparatus will add the input data chunks E and F to the chunk store as specimen data chunks for a subsequent time. In any event, the manifest for input data set 11 may then be completed by adding references to the corresponding (newly added) specimen data chunks E and F Information on any one, both, or none of the specimen data chunks may be added to the sparse chunk index 8. This is because the sparse chunk index contains information on only some specimen data chunks. If an entry in the sparse chunk index is made, for example, for specimen data chunk E, there may be recorded against the entry in the sparse chunk index 8 for E the fact that specimen data chunk E is referenced by the newly added manifest 7 in the manifest store. In one embodiment, the sparse chunk index 8 may then contain the chunk identifiers of both specimen data chunks B and E.

In one embodiment, information may be added to the sparse chunk index only in respect of specimen data chunks whose chunk identifiers have a predetermined characteristic.

Accordingly, should any subsequent input data sets contain input data chunk B—corresponding to specimen data chunk B—the data processing apparatus will identify that both manifests stored in the manifest store comprise references to specimen data chunk B. Likewise, if a subsequent input data set comprises input data chunk E, the data processing apparatus will identify that the newly added manifest (i.e. that relating to input data set 11) comprises a reference to specimen data chunk E.

A benefit of the sparse chunk index 8 containing entries for both specimen data chunks B and E is that if any future input data sets to be processed include input data chunks corresponding to either specimen data chunks B or E, the data processing apparatus will identify at least one manifest that includes a reference to the respective specimen data chunks B or E.

A benefit of data processing apparatus 3 is that an exhaustive search of the chunk store 4 for each and every input data chunk 2, to determine whether it has already been stored as a specimen data chunk 6, is not required. Instead, data processing apparatus 3 may utilize the manifests 7 created for previously processed and stored data sets. The benefits of data processing apparatus 3 are further demonstrated when the input data sets being processed are similar, to a large extent, to previously processed data sets. For example, between two full back-up operations, only a small portion of the respective data sets may be different. To have to methodically search through each specimen data chunk 6 stored in the chunk store 4, to find specimen data chunks 6 corresponding to each input data chunk of an input data set, may be inefficient and time consuming.

Data processing apparatus 3 may be able to exploit the fact that each input data set 1 being processed may be similar. As such, previous similar manifests can be used to compile at least a part of a new manifest for the latest input data set.

In one embodiment, having identified said at least one manifest, the data processing apparatus 3 is operable to search within those manifests for all other references to specimen data chunks 6 in the chunk store 4 that correspond to other input data chunks of an input data set being processed. In one embodiment, the search is performed by selecting each input data chunk from an input data set in turn—save possibly for the input data chunk which caused the manifest to be identified—and comparing it with each reference in the identified manifests. When a reference to a corresponding specimen data chunk 6 is found, the corresponding input data chunk is represented in a new manifest with a reference to the specimen data chunk 6. The search operation may continue until all input data chunks have been compared with all references in the identified manifest(s).

In another embodiment, the search operation may be terminated when, for a given manifest, a predetermined number of references to specimen data chunks 6 corresponding to input data chunks have been found. The search operation may search the identified manifests one at a time. In one embodiment, the search operation may be terminated when the current manifest being searched is found to have fewer than a predetermined number (possibly a percentage of the number of input data chunks or references in the current manifest) of references to specimen data chunks 6 corresponding to the input data chunks. In another embodiment, the search operation may be terminated when the current manifest being searched is found to have fewer than a predetermined number of references to specimen data chunks 6 corresponding to input data chunks not already determined to have corresponding specimen data chunks 6 in the chunk store 8. A benefit of these embodiments is that manifests that do not contain references to specimen data chunks 6 corresponding to any other input data chunks may quickly be discounted from the search procedure. In another embodiment, the search operation may be terminated after having processed a given number of manifests.

A benefit of an embodiment of the invention is demonstrated when the chunk store 4 contains many specimen data chunks 6. Suppose that many of the specimen data chunks 6 have been stored in the chunk store 4 for a long period of time and new input data sets being presented to the processor no longer include input data chunks 2 which correspond to those 'old' specimen data chunks 6. Suppose further that a number of the most recently processed input data sets 1 contain references to the most recently added specimen data chunks 6 to the chunk store 4. Without data processing apparatus 3, each and every input data chunk of a new input data set may be compared with each specimen data chunk 6 stored in the chunk store 4. Such data processing apparatus, not embodying the present invention, would, therefore, compare input data chunks with specimen data chunks 6 which are unlikely to be found to match. This would especially be the case where the 'old' specimen data chunks 6 are stored at the beginning of the chunk store 4, and are therefore likely to be searched first.

Data processing apparatus 3, on the other hand, may identify at least one manifest 7 in the manifest store 5 that includes at least one reference to a specimen data chunk 6 corresponding to at least one input data chunk 2. Embodiments of the present invention, therefore, can exploit the fact that input data sets containing a particular input data chunk, which input data chunk corresponds to a specimen data chunk 6 already in the chunk store 4 and having an entry in the sparse chunk index 8, may also contain input data chunks which correspond to other specimen data chunks 6 already stored in the chunk store 4.

In one embodiment of the present invention, after generating a chunk identifier for an input data chunk 2, and identifying a corresponding chunk identifier in the sparse chunk index 8 relating to a specimen data chunk 6 stored in the sparse chunk index 8, data processing apparatus 3 is operable to perform a verification procedure. The verification procedure comprises comparing the input data chunk 2 with the identified specimen data chunk 6 stored in the chunk store 4, to confirm whether the two data chunks in fact have the same contents. Without the verification procedure, particularly where partial chunk identifiers are used, it may be that a specimen data chunk 6 identified as 'corresponding' actually has different content than the input data chunk 2. To include a reference to the non-corresponding specimen data chunk 6 will introduce an error in the manifest, and prevent accurate restoration of data represented in the manifests.

In another embodiment, the verification procedure may be performed by comparing the chunk identifier of an input data chunk with a chunk identifier contained in an identified manifest. A benefit of this is that no access to the chunk store may be required at all. The verification procedure may be performed using solely the information contained in the manifest and the chunk identifiers produced for the input data chunks. Where partial chunk identifiers are stored in the sparse chunk index 8, a situation may exist where the chunk identifier of an input data chunk matches the partial chunk identifier of a specimen data chunk stored in the sparse chunk index 8, even though the respective input/specimen data chunks do not match one another. As a consequence, the manifests identified as containing a reference to a specimen data chunk corresponding to an input data chunk may not, in fact reference specimen data chunks corresponding to any input data chunks. In one embodiment, the data processing apparatus is operable to perform a verification procedure on the identified manifest(s). In one embodiment, when at least one manifest has been identified, the chunk identifier stored in the manifest(s) of the specimen data chunk which was indicated as corresponding to an input data chunk is verified. Only if the chunk identifier is identical to the chunk identifier of the input data chunk may the manifest be used for subsequent operations. This embodiment may achieve the same effect as performing the verification procedure by reading from the chunk store 4, but does not require access to the chunk store 4. It will be appreciated that the returned manifest may be much smaller in size than the chunk store 4. Accordingly, performing a comparison procedure using the identified manifest, and not the chunk store 4, may allow for at least a part of the data for comparison to be processed whilst in RAM.

Data processing apparatus 3 may be used in compacting input data sets 1 for storage, encryption or transmission. For example the input data 1 may represent sets of back-up data from a first data storage medium, for storing on a second data storage medium. Data processing apparatus 3, as described above, compares a chunk identifier of an input data chunk 2 with the chunk identifiers stored in a sparse chunk index 8. The step of comparison may require ready access to the data contained in the sparse chunk index 8. In one embodiment, the sparse chunk index 8 may be stored in random access memory (RAM). RAM allows quick, and random, access to the information contained therein. There may be a requirement, however, to reduce the RAM required for a data processing apparatus. By providing a sparse chunk index 8 to be stored in RAM, the data processing apparatus requires less RAM than processing apparatus without a sparse index.

Without providing a chunk index, data processing apparatus may compare an input data chunk 2 with each specimen data chunk 6 stored in the chunk store 4. Since the chunk store 4 may be very large, it may be difficult, or simply not possible, to store the entire contents of the chunk store 4 in RAM. The chunk store 4 may be stored in non-volatile memory, such as on disk. Reading data from the chunk store 4, therefore, will require a disk reading operation. This may be significantly slower than accessing data stored in RAM. Data processing apparatus 3 comprises a sparse chunk index 8, which may reside in RAM, allowing faster access to the information contained therein. As a result, specimen data chunks 6 stored in the chunk store 4 which correspond to an input data chunk 2 may more easily be identified, without requiring constant direct access to the chunk store 4. There may, as described above, be a verification procedure. This operation will require access to a specimen data chunk 6 stored in the chunk store 4, on disk, but this may require only one disk seek of the chunk store 4 and the retrieval of a single specimen data chunk 6.

With embodiments of the present invention comprising a sparse chunk index 8, for a first input data chunk, there may exist a first specimen data chunk 6 in the chunk store corresponding to the first input data chunk; but there is no entry relating to the first specimen data chunk 6 in the sparse chunk index 8. There may, however, be an entry in the sparse chunk index 8 for a second specimen data chunk 6 matching a second input data chunk. The data processing apparatus will then identify the manifest(s) which reference the second specimen data chunk 6. A subsequent search of those manifest(s) may be carried out. It may be that the identified manifest(s) do not contain references to the first specimen data chunk. Or, any search operation within the manifest(s) may have been terminated before finding a reference to the first specimen data chunk 6, even though a manifest may contain a reference to the first specimen data chunk 6.

It may be that the stored manifests which reference the first corresponding specimen data chunk 6 do not reference the second specimen data chunk 6. In which case, the data processing apparatus would not identify the first specimen data chunk 6 when analysing the manifests containing the second specimen data chunk 6.

Consequently, the data processing apparatus may store the first input data chunk in the chunk store as a new specimen data chunk 6, despite that there is already a specimen data chunk 6 in the chunk store 4 corresponding to the input data chunk.

Nevertheless, the benefits of requiring less RAM, and the decrease in the time taken to search through the sparse chunk index 8 may outweigh the disadvantages of the storage of some input data chunks 2 as specimen data chunks 6 for the second time.

The data processing apparatus may be operable to identify specimen data chunks 6 in the chunk store 4 corresponding to at least some input data chunks 2, whilst only comprising a sparse index. There may, in one extreme, perhaps ideal, example, be no duplicate entries in the chunk store 4. Data processing apparatus 3 with a sparse chunk index 8 may be just, or almost, as efficient at compacting input data as a data processor 3 with a full chunk index 8. By efficient is meant that the specimen data chunks 6 stored in the chunk store 4 are not duplicated, or at least not duplicated to a predetermined extent. Some duplication of specimen data chunks may be permitted. Further, some misidentification of manifests 7 comprising a reference to a specimen data chunk 6 corresponding to an input data chunk may be permitted. Embodiments of the present invention may be configured according to the balance of convenience—the envisaged disadvantage of allowing some duplication of data or misidentification of manifests 7 may be balanced, or outweighed, by the corresponding decrease in the size of sparse chunk index 8 required, or the corresponding increase in efficiency of the apparatus as a whole.

Deduplication: Zipping

Whereas 'hooking' may compare all remaining input data chunks 12 not yet known to have corresponding specimen data chunks 6 in the chunk store 4 to an entire manifest at a time, 'zipping' may limit how much of the manifest(s) is compared with input data chunks.

For example, referring again to FIG. 4, suppose that manifest 7 stored in the manifest store 5 identified as above is selected by the data processing apparatus. Because the manifest contains a reference "b" to the specimen data chunk 6 corresponding to input data chunk B, the data processor apparatus 3 determines that input data chunk B corresponds to a specimen data chunk 6 contained in the chunk store 8. It will be noted that adjacent to the reference 'b' in the manifest 7 are references a and c to specimen data chunks A and C. Similarly, adjacent input data chunk B in input data set 11, are input data chunks A and C. The data processor apparatus 3 compares reference 'a' to input data chunk A and reference 'c' to input data chunk C, finding two matches, and determines that both A and C have corresponding specimen data chunks 6 in chunk store 8.

If a match is found, data processor apparatus 3 similarly compares the next adjacent reference to the matched reference/correspondingly positioned input data chunk. In our example, this means comparing 'a' to E (fails). There is no reference to the left of the first reference 'a' so no comparison can be made there. This behaviour is repeated as long as matches continue to be found. In the example, had the fourth chunk of data set 11 been A rather than E, it would have been determined to have a corresponding specimen data chunk 6 in the chunk store 8 and 'd' would have been compared with F, which would fail, stopping these match comparisons.

The above described technique may be referred to as 'zipping', in that an input data set 1 and an identified manifest 7 are arranged such that an input data chunk 2 is aligned with the reference in the manifest 7 to a specimen data chunk 6 in the chunk store 4 corresponding to the input data chunk 2. Data processing apparatus 3 then seeks to 'zip' the input data set 1 and manifest 7 together. A successful 'zipping' procedure will result where a run of input data chunks 2 correspond to a run, of equal size, of references to specimen data chunks 6 in a manifest 7. The input data set 1 and manifest 7 may not successfully 'zip' together where a particular input data chunk 2 does not correspond to the reference to a specimen data chunk 6 in a manifest 7 attempting to be 'zipped' to the input data chunk 2.

If 'zipping' of an input data chunk against a reference in the manifest fails, the reference in the manifest may be compared against a predetermined number of adjacent input data chunks, until a match is found. This allows zipping "ghijklmnop" against GHXJIKLMNYOP around selected input chunk M successfully (note extra input data chunks X and Y which do not have matching references), to determine that input data chunks GHJIKLMNOP have corresponding specimen data chunks 6 in chunk store 8.

Conversely, an input data chunk may be compared against a predetermined number of adjacent references, until a match is found and zipping re-established. This would allow successful zipping of ghxijklmnyzop against GHIJKLMNOP (note extra references x, y, and z).

If the zipping of the selected input data chunk 12 against the first reference to its corresponding specimen data chunk 6 in the first manifest was insufficiently successful, the data processor apparatus 3 may repeat the zipping process, this time against the second reference to that specimen data chunk 6 if any. Additional references to that specimen data chunk 6 may be tried in turn while the zipping remains unsuccessful. If the zipping is still insufficiently successful, the data processor apparatus 3 may repeat the zipping process using the next identified manifest. If it proves unsatisfactory, the next may be tried in turn until enough success is achieved or a predetermined limit is reached.

An example of the above process may be described with reference to FIG. 5. FIG. 5(*a*) shows a schematic illustration of an input data set 13. FIG. 5(*b*) shows a schematic illustration of an identified manifest 14. In this example, how the manifest 14 was 'identified' is not important. All that matters in this example is that input data set 13 is compared against the manifest 14.

There are two references 'b' to specimen data chunk B in manifest 14. Suppose that that a data processor first attempts to 'zip' the input data set 13 against the first reference 'b', toward the left of the manifest 14. Zipping will be partially successful, but only for two adjacent references/input data chunks on each side of b. Any further attempt at zipping will be unsuccessful. After a predetermined number of failures, or indeed a predetermined number of successes, the data processing apparatus may attempt to 're-zip' against the second reference 'b'. In this case, it will be seen that the remaining input data chunks X, Y, E and F will successfully be 'zipped' against the references 'x', 'y', 'e' and 'f'. Without carrying out such a process according to an embodiment, the references 'x', 'y', 'e' and 'f' may never have been found, because none have an entry in the sparse chunk index.

Once the data processing apparatus 3 has finished with the first selected input data chunk 12—i.e. when it has hopefully found at least one reference to a specimen data chunk 6 corresponding to at least one other input data chunk—it selects a new input data chunk 12, if any, which corresponds to a specimen data chunk for which information is stored in the sparse chunk index, and repeats the zipping procedure with it. This is repeated until no input data chunks 12 which correspond to specimen data chunks for which information is stored in the sparse chunk index remain to be selected. At this point, data processor apparatus 3 has finished determining which of the input data chunks 12 in data set 11 have corresponding specimen data chunks 6 in chunk store 8.

Prioritization of Manifests

The data processing apparatus is operable to process input data into input data chunks; identify manifests having at least one reference to one of said specimen data chunks that corresponds to one of said input data chunks and on which there is information contained in the sparse chunk index; and prioritize the identified manifests for subsequent operations. There are various methods to determine how the manifests are identified, and how the sparse chunk index is populated. Some embodiments to the present invention relate to how said identified manifests are prioritized for subsequent operation.

Figure 6:
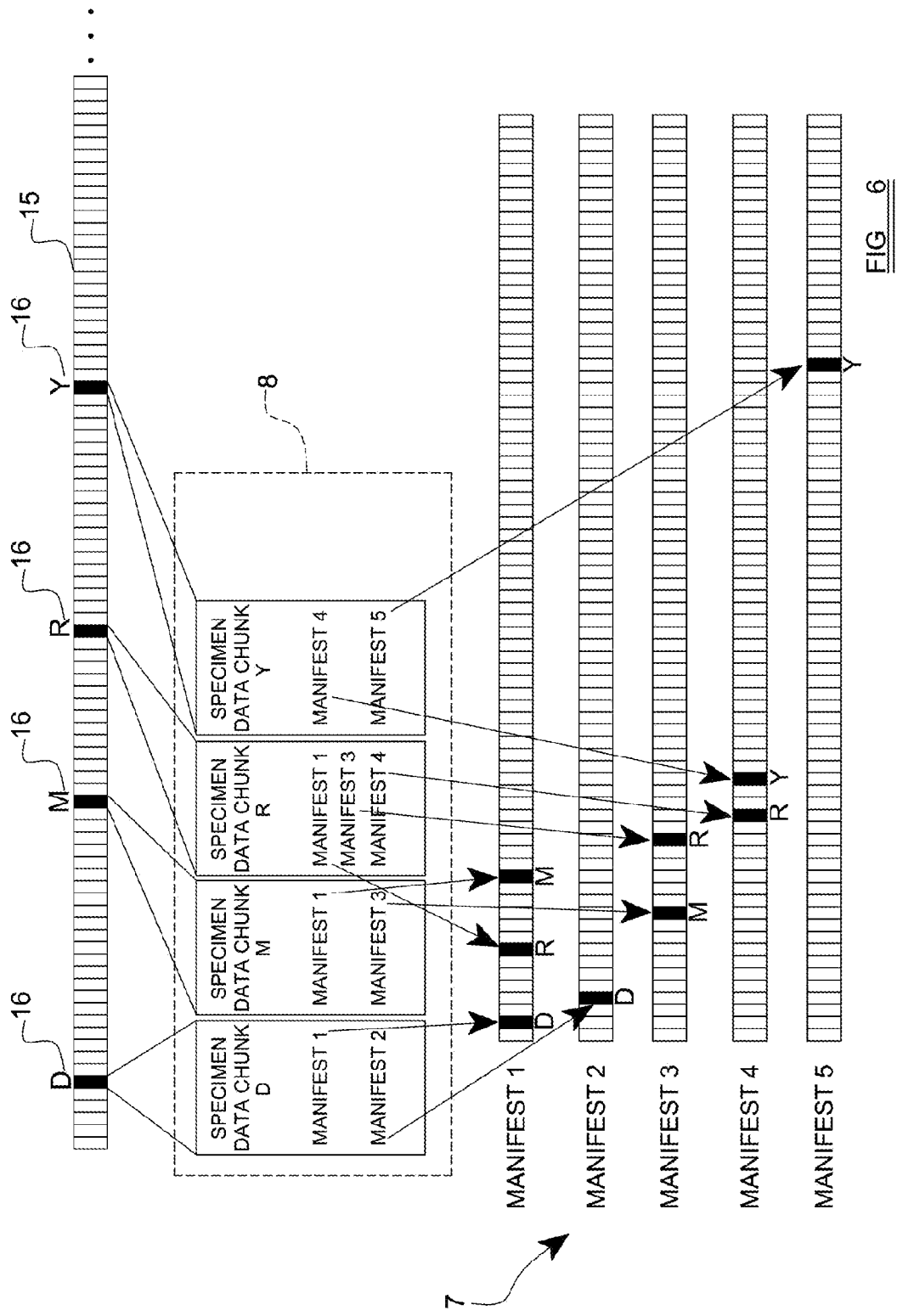
FIG. 6 shows a schematic representation of an input data set, a sparse chunk index and manifests.

FIG. 6 shows a schematic representation of an input data set 15. As illustrated, the input data set 15 has been processed into a plurality of input data chunks by the data processing apparatus. Some input data chunks 16 are shaded, namely D, M, R and Y. In the illustration, the shaded input data chunks 16 are those which correspond to specimen data chunks in the chunk store on which the sparse chunk index 8 contains information. Thus, as shown in FIG. 6, the sparse chunk index 8 contains entries on, inter alia, specimen data chunks D, M, R and Y. In one embodiment of the present invention, for each entry in the sparse chunk index for a given specimen data chunk, there may be a list of all of the manifests stored in the manifest store which contain a reference to that specimen data chunk. As shown in FIG. 6, the entry in the sparse chunk index 8 for specimen data chunk D comprises references to manifest 1 and manifest 2, also shown schematically in FIG. 6.

Manifests 1 to 5 in FIG. 6 are the manifests identified by the data processing apparatus as including at least one reference to a specimen data chunk that corresponds to one of the input data chunks and on which there is information contained in the sparse chunk index.

It will be noted that of the four specimen data chunks having entries in the sparse chunk index 8 corresponding to input data chunks 16 of the input data set 15, some of the identified manifests have references to more than one of said specimen data chunks. For example, manifest 1 contains references to specimen data chunks D, R and M. It will be noted that the order of the occurrence of references in manifests to specimen data chunks need not necessarily be the same order in which input data chunks corresponding to those specimen data chunks appear in an input data set 15. For example, it will be noted that the order of the first three identified input data chunks 16, of input data set 15, is D-M-R but the order of references to the specimen data chunks, in manifest 1, is D-R-M.

An advantage of data processing apparatus according to an embodiment is that the identified manifests may be used in an attempt to find references to specimen data chunks which correspond to further input data chunks of an input data set being processed. Thus, it is hoped that by processing at least one of the identified manifests 1 to 5, at least one of the other (i.e. unshaded) input data chunks of input data sets 15 will be matched against at least one of the specimen data chunks referenced by at least one of the identified manifests.

In an embodiment of the present invention, data processing apparatus may identify a plurality of manifests having at least one reference to one of said specimen data chunks that corresponds to one of said input data chunks and on which there is information contained in the sparse chunk index. It follows naturally that some of the identified manifests may be more useful than others. By "more useful" is meant that the manifest contains a higher number of references to specimen data chunks corresponding to input data chunks of an input data set 15.

Accordingly, in embodiments of the present invention, data processing apparatus is operable to prioritize the identified manifests for subsequent operation.

In one embodiment, the data processing apparatus is operable to prioritize the identified manifests for subsequent operation according to the number of specimen data chunks referenced therein which correspond to input data chunks and upon which there is information contained in the sparse index. Thus, with reference to FIG. 6, it will be noted that manifest 1, for example, contains references to three of the specimen data chunks upon which there is information stored in the sparse chunk index 8 and which match input data chunk 16 of the input data set 15—we call these, for the sake of brevity, "hits".

Thus, because manifest 1 contains references to many specimen data chunks which correspond to input data chunks 16 of an input data set 15 and on which there is information stored in the sparse chunk index, it may be assumed that manifest 1 will be useful in a subsequent operation, as described above. Accordingly, the identified manifests may be prioritized based on the number of corresponding specimen data chunks referenced therein and upon which there is information contained in the sparse index. Referring to the five identified manifests 1 to 5 in FIG. 6, manifest 1 may be prioritized such that it is processed first. Manifests 3 and 4 both contain two "hits" and may therefore be prioritized so as to be processed either second or third. Finally, manifests 2 and 5, having only one "hit", may be prioritized to be processed fourth and fifth.

Where two identified manifests contain the same number of "hits", the order in which those manifests are processed may be random or based on other parameters. For example, whichever manifest is larger (i.e. contains references to more specimen data chunks) has a larger number of references against which to compare input data chunks. Thus, because there is a higher number of references to specimen data chunks in the manifest, there may be a higher chance of finding specimen data chunks corresponding to input data chunks.

In other embodiments, where at least two identified manifests have the same number of "hits", they may be prioritized based on the age of the manifests, for example when the manifest was added to the manifest store. It may be that more recently added manifests are more likely to be similar to an input data set being processed. In which case, the "newer" (i.e. most recent) manifest may be processed first.

In another embodiment, all of the identified manifests (regardless of how many "hits" each contain) may be prioritized according to, at least in part, when each identified manifest was added to the manifest store. In one embodiment, the most recently added manifests may be processed first. This is because most recently added manifests may be most similar to an input data set being processed.

Prioritization Scoring

In another embodiment, each identified manifest may be allocated a score, depending on the number of "hits" each contains. If such a scoring system was used in the embodiment described above where manifests are prioritized according to the number of "hits" each contains, it will be appreciated that the manifests would be arranged in descending numerical order of their scores.

In an embodiment of the present invention, the identified manifest with the highest score is processed first by the data processing apparatus. For example, assume that manifest 1 shown in FIG. 6 is selected by the data processing apparatus. In one embodiment, each specimen data chunk referenced by manifest 1 may be compared with each and every input data chunk of the input data set 15, in an attempt to find specimen data chunks corresponding to the input data chunks 16 of input data set 15. In an embodiment using "zipping", each of the references to specimen data chunks D, R and M in manifest 1 may be "zipped" against the corresponding input data chunks D, M and R in input data set 15. It is hoped that, by doing so, the references in manifest 1 neighbouring those to specimen data chunks D, R and M may be found to match the input data chunks 16 in the input data set 15 neighbouring input data chunks D, M and R.

In this "prioritization scoring" embodiment, when a given manifest has been fully processed, (i.e. its references compared against at least some of the input data chunks of an input data set 15) then it may be discarded. In an embodiment, the scores of the remaining manifests may then be amended. In one embodiment, the score of the remaining manifests is reduced by "1" whenever a manifest shares a reference to a specimen data chunk which was also referenced by the previously processed, and discarded, manifest. Referring to FIG. 6, it will be noted that manifest 2 only contains a reference to specimen data chunk D; manifest 3 contains a reference to specimen data chunks M and R; and manifest 4 contains a reference to specimen data chunk R (in addition to a reference to specimen data chunk Y). Accordingly, the score of manifest 2 will be reduced by 1, resulting in a score of "0", because both manifest 2 and manifest 1 contain a reference to specimen data chunk "D". Similarly, the scores of manifests 3 and 4 will be reduced to "0" and the score of manifest 4 will be reduced, by "1", to "1".

Following the recalculation of the scores, the identified manifests are re-prioritized in descending order of their recalculated scores. With reference to FIG. 6, it will be appreciated that manifests 1, 2 and 3 now have a score of "0", whereas manifests 4 and 5 both have a score of "1". Accordingly, by amending the scores according to an embodiment of the present invention, data processing apparatus may not then waste time by processing manifests 2 and 3 (which contain no new "hits"), but instead move on to process one of manifests 4 and 5. As described above, one of manifests 4 and 5 may be chosen to be processed next according to another characteristic of the manifest. For example, one of manifest 4 and 5 may be chosen according to its age, size or other predetermined characteristic. It will be appreciated that manifest 4 may have more in common with the input data set 15 than does manifest 5 because it contains two "hits" whereas manifest 5 only contains one "hit". The manifest scores may be recalculated, and the manifests re-prioritized after each iteration. In one embodiment, the manifests which, when re-calculated, have a score of "0" may still be processed, but after all the manifests having a positive score are processed.

Where a plurality of manifests are identified by the data processing apparatus, only a predetermined number of manifests may be prioritized for subsequent operation. In another embodiment, having identified a plurality of manifests, they may be prioritized according to the number of "hits" each contains. In one embodiment, only a predetermined number of the highest scoring manifests are subsequently used for processing. In another embodiment, only those manifests with a score equal to or above a predetermined score may be selected for subsequent operation. In yet another embodiment, only those identified manifests having greater than a predetermined ratio of the number of "hits" to the total number of references to specimen data chunks may be selected for subsequent operation. Thus, if a manifest contains references to, say, 500 specimen data chunks but the manifest only contains one "hit", it may be deemed that the specimen data chunks referenced by that manifest may be unlikely to correspond to input data chunks of an input data set.

In another embodiment, the prioritisation and processing of identified manifests may be terminated when a predetermined number of input data chunks of an input data set have been found to correspond to specimen data chunks referenced by the manifests. Thus, for a given input data set comprising, say, 200 input data chunks, if a predetermined number of input data chunks (for example, 150) have been found to correspond to specimen data chunks, any further processing of the input data set may be terminated, since the likelihood of finding specimen data chunks corresponding to the remaining input data chunks may reduce beyond a reasonable level.

Conversely, in another embodiment, the processing of an identified manifest may be terminated when a predetermined number, or ratio, of references to specimen data chunks corresponding to input data chunks of an input data set have been found. For example, when processing an identified manifest in order to identify references to specimen data chunks corresponding to input data chunks of an input data set, there may reach a point where the number of references to specimen data chunks corresponding to new input data chunks reduces in frequency—according to the law of diminishing returns. In which case, the processing of the current manifest may be terminated and the next manifest in the prioritized list of manifests may then be processed.

Sparse Chunk Index Pruning

In one embodiment, data processing apparatus is operable to manage the information contained in the sparse chunk index. In an embodiment, the data processing apparatus is operable to remove information ("prune") from the sparse chunk index according to at least one predetermined criterion. By pruning according to a criterion in accordance with an embodiment, the size of memory needed to store the sparse chunk index may be reduced, whilst still allowing some embodiments of the invention to operate efficiently and effectively.

Conceptually, the sparse chunk index maps (partial) chunk identifiers to lists of manifest references. Alternatively, it can be thought of as a set of pairs of (partial) chunk identifier, manifest reference pairs. A pruning algorithm must decide how many and which pairs to remove when. In some embodiments, the data processing apparatus chooses which pairs to remove based on the at least one predetermined criterion.

In one embodiment, the at least one predetermined criterion is based on when the specimen data chunk corresponding to a pair's chunk identifier was added to the chunk store. In another embodiment, the at least one predetermined criterion is based on the number of times the specimen data chunk corresponding to a pair's chunk identifier has corresponded to an input data chunk processed by the data processing apparatus.

In other embodiments, the data processing apparatus chooses entries to prune and either removes those entries entirely or prunes their contents; in one embodiment, the pruning of an entry's contents is done using a different method that uses a second at least one predetermined criterion. If pruning an entry's contents results in an empty list of manifest references, then that entry may be removed from the sparse chunk index.

In one embodiment, if a specimen data chunk having an entry in the sparse chunk index is not found to match any of the incoming data chunks for a predetermined period of time, then some or all of the information contained in the sparse chunk index relating to that specimen data chunk may be deleted, or the information changed to a pruned version. In another embodiment, an entry in the sparse chunk index may be deleted when the corresponding specimen data chunk is found not to correspond to any of the incoming data chunks for a predetermined number of operations. In one embodiment, an "operation" may be the processing of an entire input data set. For example, if during the processing of, say, one hundred data sets, none of the input data chunks has been found to correspond to a specimen data chunk having an entry in the sparse chunk index, then that entry may be removed from the sparse chunk index. An advantage of such an embodiment is that information relating to seldom used reference chunks may be removed, or at least minimised, in the sparse chunk index.

In one embodiment, pruning is performed periodically or when a particular event occurs, such as the sparse chunk index approaching, reaching, or exceeding a predetermined level or capacity. In another embodiment, pruning is performed throughout—as a background process. In another embodiment, each insertion of information into the sparse chunk index is preceded by the pruning of an equivalent amount of information unless the sparse chunk index is below its predetermined level or capacity. In one embodiment, inserting a new entry may be preceded by removing an old entry. In one embodiment, adding a new manifest reference to an existing entry may be preceded by pruning the contents of that entry.

Pruning may be performed so as to limit the total number of entries in the index, pairs in the index, and/or manifest references per entry. For example, in some embodiments each entry may be limited to containing at most a constant R number of manifest references; adding a new manifest reference in these embodiments may require pruning at least one manifest reference first.

Least Recently Created (LRC)

One criterion for selecting items (pairs, entries, or manifest references in a given entry) from a set to prune is least recently created. Under LRC, the item that was added to the sparse chunk index ("created") least recently is chosen for pruning.

In one embodiment each entry is limited to R manifest references and entry contents are pruned by removing the manifest reference to the oldest manifest referenced. (References to older manifests are added before references to newer manifests.)

As described above, for the entry, if any, in the sparse chunk index for a given specimen data chunk, there may be comprised at least a partial list of manifests containing a reference to that specimen data chunk. Where only a partial list of only the most recent R manifests to contain a reference to a given specimen data chunk are maintained, we may use an algorithm which we call "Least Recently Created" (LRC) to manage the partial list of manifests stored against an entry in the sparse chunk index for a given specimen data chunk. For example, if a given entry in the sparse chunk index already has R manifests recorded against it, and a new manifest being compiled also contains a reference to the specimen data chunk, then a reference to one of the R manifest references recorded against the entry in the specimen data chunk may be removed, to allow a reference to the most recently compiled manifest to be added to the sparse chunk index. In one embodiment, references to the R manifests are removed in accordance with an LRC algorithm. Thus, for the entry in the sparse chunk index for a given specimen data chunk, the reference to the oldest manifest of the R manifests is removed from the sparse chunk index. A reference to the newly compiled manifest may then be added to the sparse chunk index. As a result, the entry in the sparse chunk index will still contain information relating to the most recent R manifests.

It will be appreciated that with the LRC algorithm as described, there may be no regard given to the actual "age" of a manifest in the manifest store, to which there is maintained a reference in the sparse chunk index. Instead, regard may be given to the "relative" age of manifests.

In an embodiment of the present invention, even though a manifest may still have a reference to it contained in the sparse chunk index, and be one of the most recent R manifests to be added to the manifest store comprising a reference to a specimen data chunk, the reference to that manifest may be deleted after a predetermined amount of time or number of operations.

It should be noted and appreciated that although a "reference" to a manifest in the sparse chunk index for a given specimen data chunk is said to be "deleted", the manifest itself is not deleted. The algorithms described above and below relate to the management of the sparse chunk index. Any deletion of manifests, themselves, may be separate to the management/pruning of the sparse chunk index. It will be appreciated that manifests should be maintained in the manifest store so as to enable data recovery as required by a user. The maintenance of a sparse chunk index is beneficial to data compaction and may not need to be accessed during any data recovery procedure.

In one embodiment of LRC, an ordered list of the (partial) chunk identifiers mapped by the sparse chunk index is maintained, sorted by the time they were added to the sparse chunk index. When an entry for a new (partial) chunk identifier needs to be inserted and the sparse chunk index already has the maximum number of entries permitted under this embodiment, the entry having the oldest (partial) chunk identifier (this will be the first (partial) chunk identifier of the ordered list) is removed from the index and list; the new entry is then added to the index and its (partial) chunk identifier added to the end of the ordered list.

Least Recently Used (LRU)

Another criterion for selecting items from a set to prune is least recently used. Under LRU, the item that was "used" least recently is chosen for pruning. In one embodiment, we consider an entry and its associated pairs and manifest references used when that entry's (partial) chunk identifier is looked up in the sparse chunk index, e.g. when the chunk identifier is found to correspond to that of an input data chunk being processed.

In an example of the use of LRU, in one embodiment an ordered list of the (partial) chunk identifiers mapped by the sparse chunk index is maintained. Each time a (partial) chunk identifier is successfully looked up in the sparse chunk index, it is moved to the front of the ordered list. Likewise, each time a new (partial) chunk identifier is added to the sparse chunk index, it is added to the front of the ordered list. These steps ensure that the ordered list is ordered from most recently used to least recently used.

When an entry for a new (partial) chunk identifier needs to be inserted and the sparse chunk index already has the maximum number of entries permitted under this embodiment, the entry having the least recently used (partial) chunk identifier (this will be the last (partial) chunk identifier of the ordered list) is removed from the index and list; the new entry is then added to the index.

Another embodiment is similar, but instead of moving used (partial) chunk identifiers immediately to the front of the ordered list when they are used, it moves the used chunk identifiers at most a certain distance (number of positions) toward the front. It may thus take several uses to bring a chunk identifier to the front of the ordered list. Another embodiment also inserts new chunk identifiers in the middle of the ordered list rather at the front so new identifiers also require several uses to reach the front.

As described above, some embodiments use multiple methods and criteria. For example, one embodiment uses LRU as described above to prune entries when new entries need to be inserted and LRC as previously described to prune an entry's contents when manifest references need to be added to that entry's contents.

Least Recently Valued (LRV)

As described previously, the data processing apparatus is operable to identify manifests having at least one reference to one of said specimen data chunks that corresponds to one of said input data chunks and on which there is information contained in the sparse chunk index. As also described previously, where a plurality of such manifests are identified by the data processing apparatus, only a predetermined number of manifests may be prioritized for subsequent operation. In another embodiment, only a predetermined number of the highest "scoring" manifests may be used for subsequent processing. The "scoring" of manifests may be determined according to the "prioritisation scoring" embodiment disclosed previously.

Another criterion for selecting items from a set to prune is least recently valued. Under LRV, the item that was "valued" least recently is chosen for pruning. We consider a pair valued when its existence in the sparse chunk index causes its referenced manifest's score to be raised and its referenced manifest is used for subsequent processing (in part) because of its score. When selecting from a set of entries, we consider an entry valued when any of its associated pairs are valued.

For example, in one embodiment where entry contents are pruned using LRV, each entry is maintained as an ordered list with the most recently valued manifest references listed first. When a new manifest reference is added to an entry, it is placed at the front of the list. When looking for manifests to use in deduplicating an input data set, the data processing apparatus computes how many "hits" each existing manifest has via the sparse chunk index. For each chunk X in the input data set, a hit occurs for manifest M if there is an entry in the sparse chunk index for the chunk identifier for X that contains a reference to manifest M. In other words, the manifest reference is "responsible" for that hit.

Some of the higher-scored manifests will be used in processing the input data set; the manifest references responsible for the hits belonging to those manifests are considered valued and moved to the beginning of their entry's ordered list. Manifest references responsible for hits for manifests that were not used to process input data are not considered valued and are not moved. These steps ensure that the manifest references of an entry are maintained in most recently valued order. When an entry's contents needs to be pruned, its last entry(s) can be removed.

Another embodiment is similar, but instead of moving valued manifest references immediately to the front of the ordered list that contains them when they are valued, it moves the valued manifest references at most a certain distance (positions) toward the front. It may thus take several instances of being valued to bring a manifest reference to the front of its ordered list. Another embodiment also inserts new manifest references in the middle of the ordered list rather at the front so new manifest references also require several instances of being valued to reach the front.

The extent of promotion (movement towards the front of the list) of a valued manifest reference may be variable. In one embodiment, the higher the score of a manifest used in deduplication, the more promoted the manifest references responsible for its hits. In another embodiment, the more useful a manifest (i.e., the more input data chunks not duplicated in the chunk store because they are already referenced by that manifest), the more places the manifest references responsible for that manifest's hits are promoted.

There are various combinations for how to maintain entries in the sparse chunk index for a specimen data chunk; and how then to maintain references to manifests in the manifest store having references to those specimen data chunks. The entries/references may be managed according to any one or a combination of the above-described algorithms of LRC, LRU, and LRV.

Controlled Fading

For a given manifest stored in the manifest store, suppose that the manifest contains references to, say, five specimen data chunks which have entries in the sparse chunk index (i.e. 5 "hooks"). Thus, it may be assumed that against each of those entries in the sparse chunk index, there is a reference to the manifest in the manifest store. If using the least recently used (LRU) or, indeed, the least recently created (LRC) algorithm described above, then it is likely that as that manifest ages in the manifest store, and is not used by data processing apparatus, all of the references to the manifest in each of the entries for the constituent specimen data chunks may be retired at the same time. In doing so, all references to that manifest may be lost at roughly the same time. This is despite the fact that the manifest contains references to many specimen data chunks in the chunk store. Other manifests in the manifest store, to which there are still maintained references in the sparse chunk index, may have fewer references to specimen data chunks. It may thus be detrimental to lose references in the sparse chunk index to such manifests with a high number of "hooks", just because it has aged beyond a predetermined time, or has not been used in a predetermined number of operations.

Accordingly, in some embodiments, the set of (partial) chunk identifiers is divided into two subsets and pruning is performed differently for the entries belonging to each subset; in particular, information in the first subset is allowed to persist longer than that of the second subset. In other embodiments, more than two subsets are used.

For example, in one embodiment entries whose chunk identifier mod 4=0 (the first subset) are allowed to have up to 10 manifest references, whereas the other entries (the second subset) are only allowed to have up to four manifest references. Thus, our example manifest with 5 hooks may have two hooks in the first subset and three hooks in the second subset; as it ages while being unused, the references to it from the three hooks in the second subset will be pruned first and only later the references to it from the two hooks from the first subset.

Approximate Ranking

We have described embodiments above that completely rank a set of items with respect to LRC, LRU, or LRV then prune the highest ranked item(s). Other embodiments maintain only approximate ranking of items. For example, one embodiment assigns a small rank number (e.g., from 1 to 100) to each pair, where pairs with smaller rank numbers are ranked higher than pairs with larger rank numbers. Promoting a pair involves changing its rank number to the highest rank number being used. Pruning involves removing all pairs with the lowest rank number and then incrementing each pairs' rank number. Removal of pairs is best done incrementally as a sweep through the sparse chunk index in the background.

In other words, ranking is performed using ranking 'bins', where an item in the sparse chunk index is assigned to one of the 100 rank 'bins'—not given a unique 'global' rank. Associated with each rank 'bin', there may be a plurality of items.

By storing X next to each pair P where X is P's rank number—start mod 256, only one byte per pair can be used and every pair's rank number can be incremented merely by decrementing start mod 256. By contrast, maintaining a linked list of pairs typically requires four bytes per pair.

Probabilistic Pruning Algorithms

Probabilistic approximate implementations of LRC/LRU/LRV are also possible. For example, instead of keeping an ordered list, a "score" may be associated with each item. Periodically (perhaps a sweep algorithm cycles around the sparse chunk index) a random number is generated for each item and the resultant number is biased by the score. Items with biased scores below a predetermined level are removed. Items with biased scores above a predetermined number are maintained. Thus, an item with a higher initial score is more likely to be maintained, although the nature of biasing the score with a random number may occasionally cause the resultant biased score to be below the predetermined number. Before moving on, we adjust the score. If insertions and promotions raise the score and we adjust the score downwards (possibly probabilistically) each time we stop by, this implements approximate probabilistic LRU/LRC/LRV. Note that the score here could be as small as one or two bits or (in the LRC case) zero bits. A deterministic version of this is also possible where we discard if the score is too low rather than generating a random number.

In one embodiment, items may be removed at random, or in a pseudo random fashion. For each item belonging to the set of items to be pruned, the data processing apparatus may generate a random number. Should the random number generated be less than the predetermined level, then that item may be deleted. It will be appreciated that the deletion does not then depend on the usefulness of the item but merely on the number generated by the random number generator. It will further be appreciated that such an algorithm may remove references to manifests which may be of significant use to the data processing apparatus in processing an input data set.

Accordingly, in one embodiment, the data processing apparatus may generate a random number for each item, but the generated random number may be "weighted" (or biased) according to a score associated with the item. The "scores" may be maintained by any one of the prioritisation algorithms described above. Accordingly, for a given item, if an otherwise unfavourable random number is generated (i.e. one which would usually cause that item to be deleted), the subsequent weighting of the score may cause the item to be maintained without deletion. Similarly, a item with a relatively high generated number (which would otherwise cause the item to be maintained) may have a low weighting associated with it, causing the weighted score to fall below a predetermined level, and the item to be deleted.

Segmenting

In the embodiments of the present invention described above and as claimed, the data processing apparatus processes input data into input data chunks and identifies manifests as prescribed by some embodiments of the invention.

In an alternative embodiment within the scope of some embodiments of the claimed invention, the data processing apparatus is operable to divide a manifest into manifest segments. A manifest segment may be a section of concurrent data of the manifest. A manifest may be divided into a plurality of manifest segments. All of the manifest segments of a manifest may each be of a predetermined size, varying size, or may all be substantially the same size. In one embodiment, each manifest segment comprises a plurality of references to specimen data chunks in the chunk store.

In one embodiment, a manifest is stored in the manifest store as a single block of references to specimen data chunks. The manifest segments may be partitioned within the manifest by the use of markers or reference points to boundaries. The boundary of a manifest segment may or may not be coterminous with a boundary of a reference to a specimen data chunk.

In one embodiment, manifest segments may be stored separately in the manifest store. There may be a record maintained of which manifest segments together constitute a particular manifest. If a user wishes to recover a data set represented by a given manifest divided into manifest segments, the manifest may first be reconstructed using the manifest segments and the record of how the manifest segments together constitute the manifest. Each reference in the reconstructed manifest to specimen data chunks in the chunk store is then used to reconstruct the original data set; or, rather, each reference in the each manifest segment of the reconstructed manifest is then used to reconstruct the original data set.

In one embodiment, the data processing apparatus is operable to process input data into input data segments, each comprising one or more input data chunks. In addition, the data processing apparatus comprises a manifest store containing at least one manifest that represents at least a part of a data set and is divided into manifest segments. The data processing apparatus is operable to identify at least one of the manifest segments having at least one reference to a specimen data chunk that corresponds to at least one input data chunk of an input data segment and upon which there is information contained in the sparse chunk index. The identified manifest segments may then be prioritized for subsequent operation.

Pruning by Manifests or Manifest Segments

The previously described embodiments prune pairs, entries, and/or manifest references. Alternative embodiments prune instead manifests or manifest segments. LRC, LRU, or LRV can be used, where a manifest (segment) is considered used/valued whenever a pair referencing it is used/valued. Each use/instance of being valued should only promote the manifest (segment) a short distance. When a manifest (segment) is removed, every pair referencing it is removed from the sparse chunk index.

Figure 7:
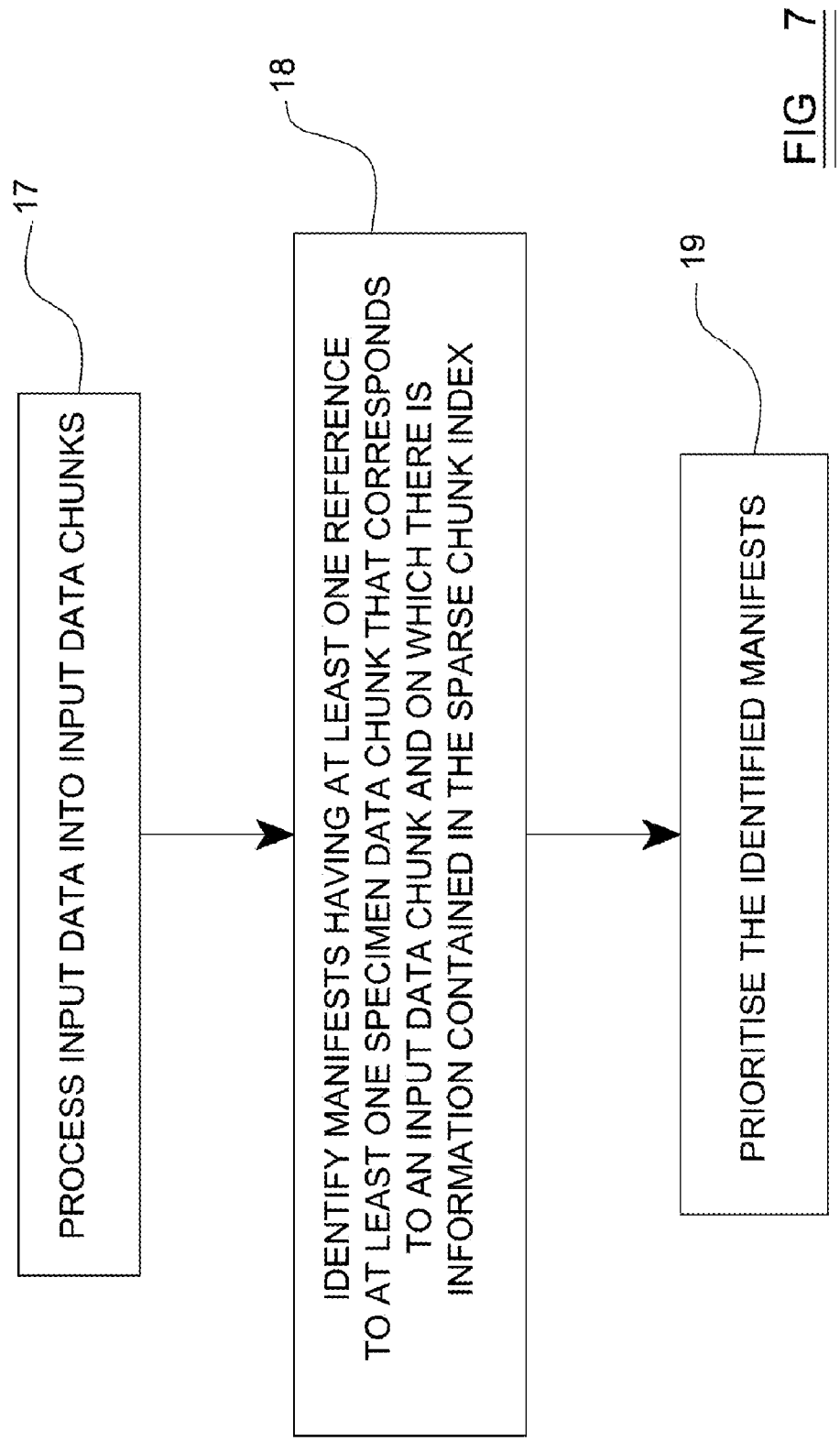
FIG. 7 shows a flow chart of a method according to an embodiment.

In an embodiment, with reference to FIG. 7, a method comprises: processing 17 input data into input data chunks; identifying 18 and prioritising 19 manifests having at least one reference to one of said specimen data chunks that corresponds to one of said input data chunks and on which there is information contained in the sparse chunk index.

It should further be appreciated that, with embodiments of the present invention, for a given input data set, references to specimen data chunks corresponding to input data chunks of the input data set may be found across a plurality of unconnected and unrelated manifests. For example, different parts of an input data set being processed may be identical to different parts of a plurality of previously compiled manifests. Thus, if an input data set is identical to the combination of two previously processed input data sets, apparatus and methods according to some embodiments may be operable to identify the respective manifests of those two previous input data sets and compile a new manifest using the references in the previous manifests. This may be despite the fact that, at the time of processing, the previous two input data sets had no connection with or relevance to, one another.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A data processing apparatus comprising:
a chunk store containing specimen data chunks,
a manifest store containing a plurality of manifests, each of which represents at least a part of a data set and each of which comprises at least one reference to at least one of said specimen data chunks,
a sparse chunk index containing information on only some specimen data chunks,
at least one processor to:
process input data into input data chunks;
identify manifests having at least one reference to one of said specimen data chunks that corresponds to one of said input data chunks and on which there is information contained in the sparse chunk index, wherein for a particular specimen data chunk indexed by the sparse chunk index, the sparse chunk index contains information on the most recent predetermined number of manifests added to the manifest store that comprise a reference to said particular specimen data chunk, and wherein the sparse chunk index further contains information for manifests that reference other specimen data chunks; and
prioritize the identified manifests for subsequent operation.

2. The data processing apparatus according to claim 1, operable to prioritize the identified manifests for subsequent operation according to a number of corresponding specimen data chunks upon which there is information contained in the sparse chunk index.

3. The data processing apparatus according to claim 2, operable to prioritize the identified manifests in descending order of the number of references each contains to specimen data chunks on which there is information contained in the sparse chunk index and which correspond to the input data chunks.

4. The data processing apparatus according to claim 1, wherein the at least one processor is to prioritize the identified manifests according to when each of the identified manifests was added to the manifest store.

5. The data processing apparatus according to claim 1, wherein said subsequent operation is to identify, in at least one said prioritized manifest, references to specimen data chunks corresponding to input data chunks of the input data upon which information is not contained in the sparse chunk index.

6. The data processing apparatus according to claim 1, wherein the at least one processor is to re-prioritize a subset of the identified manifests after a particular one of the identified manifests has been used in the subsequent operation, wherein the re-prioritizing considers presence of references to specimen data chunks in each of the subset of identified manifest which are also present in the particular manifest.

7. The data processing apparatus according to claim 1, wherein the at least one processor is to process each of the prioritized manifests, in turn, while a predetermined condition of a preceding given manifest has been met.

8. The data processing apparatus according to claim 1, operable to store a particular input data chunk in the chunk store as a specimen data chunk, in response to failing to determine that a specimen data chunk corresponding to the particular input data chunk exists in the chunk store.

9. The data processing apparatus according to claim 1, operable to remove information from the sparse chunk index according to at least one predetermined criterion.

10. The data processing apparatus according to claim 9, wherein the at least one predetermined criterion is based on when a specimen data chunk to which the information entered in the sparse chunk index relates was added to the chunk store.

11. The data processing apparatus according to claim 9, wherein the at least one predetermined criterion is based on a number of times a specimen data chunk to which the information entered in the sparse chunk index relates has corresponded to an input data chunk.

12. A data processing apparatus comprising:
a chunk store containing specimen data chunks;
a manifest store containing a plurality of manifests, each of which represents at least a part of a data set and each of which comprises at least one reference to at least one of said specimen data chunks;
a sparse chunk index containing information on only some specimen data chunks;
at least one processor to:
identify manifests in the sparse chunk index, wherein each of the identified manifests includes at least one reference to a specimen data chunk in a chunk store corresponding to at least one input data chunk in an input data set, wherein for a particular specimen data chunk indexed by the sparse chunk index, the sparse chunk index contains information on the most recent predetermined number of manifests added to the manifest store that comprise a reference to said particular specimen data chunk, and wherein the sparse chunk index further contains information for manifests that reference other specimen data chunks;
prioritize the identified manifests for subsequent operation according to a number of said corresponding specimen data chunks referenced by each of the identified manifests.

13. The data processing apparatus according to claim 12, wherein the at least one processor is to re-prioritize a subset of the identified manifests after a particular one of the identified manifests has been used in the subsequent operation, wherein the re-prioritizing considers presence of references to specimen data chunks in each of the subset of identified manifest which are also present in the particular manifest, and wherein the subset excludes the particular identified manifest.

14. A data processing apparatus, comprising:
a chunk store containing specimen data chunks;
a manifest store containing manifests, each of which represents at least a part of a data set and comprise at least one reference to at least one of said specimen data chunks;
a sparse chunk index containing information on only some specimen data chunks; and
at least one processor to:
process input data into input data chunks;
identify manifests each having at least one reference to one of said specimen data chunks that corresponds to one of said input data chunks and on which there is information contained in the sparse chunk index, wherein for a particular specimen data chunk indexed by the sparse chunk index, the sparse chunk index contains information on the most recent predetermined number of manifests added to the manifest store that comprise a reference to said particular specimen data chunk, and wherein the sparse chunk index further contains information for manifests that reference other specimen data chunks;
prioritize the identified manifests for subsequent operation according to a prioritization criterion;
in the subsequent operation, use the prioritized identified manifests in an order according to the prioritizing; and
subsequently manage the information contained in the sparse chunk index.

15. A method of processing data, comprising:
providing a chunk store containing specimen data chunks;
providing a manifest store containing manifests representing at least a part of a data set, each of the manifests comprising at least one reference to at least one of said specimen data chunks; and
providing a sparse chunk index containing information on only some specimen data chunks, wherein for a particular specimen data chunk indexed by the sparse chunk index, the sparse chunk index contains information on the most recent predetermined number of manifests added to the manifest store that comprise a reference to said particular specimen data chunk, and wherein the sparse chunk index further contains information for manifests that reference other specimen data chunks;
processing input data into input data chunks;
identifying manifests having at least one reference to one of said specimen data chunks that corresponds to one of said input data chunks and on which there is information contained in the sparse chunk index; and
prioritizing the identified manifests according to a prioritization criterion.

16. A method of processing data according to claim 15, further comprising:
processing each of the prioritized manifests, in turn, to identify references to specimen data chunks corresponding to input data chunks of the input data that do not have information about them contained in the sparse chunk index.

17. A method of data processing, comprising:
providing a chunk store containing specimen data chunks;
providing a manifest store containing manifests representing at least a part of a data set, each of the manifests comprising at least one reference to at least one of said specimen data chunks; and
providing a sparse chunk index containing information on only some specimen data chunks;
identifying manifests in the sparse chunk index, wherein each of the identified manifests includes at least one reference to a specimen data chunk in a chunk store corresponding to at least one input data chunk in an input data set, wherein for a particular specimen data chunk indexed by the sparse chunk index, the sparse chunk index contains information on the most recent predetermined number of manifests added to the manifest store that comprise a reference to said particular specimen data chunk, and wherein the sparse chunk index further contains information for manifests that reference other specimen data chunks; and
prioritizing the identified manifests for subsequent operation according to a number of corresponding specimen data chunks referenced by each of the identified manifests.

18. The data processing apparatus according to claim 1, wherein the sparse chunk index includes groups of manifests for corresponding ones of the some specimen data chunks, wherein the identified manifests correspond to one of the groups.

19. The data processing apparatus according to claim 12, wherein the sparse chunk index includes groups of manifests for corresponding ones of some specimen data chunks, and wherein the identified manifests correspond to one of the groups.

20. The data processing apparatus according to claim 19, wherein the at least one processor is to further:
 compare references in a particular one of the identified manifests to references calculated for input data chunks of the input data set;
 based on the comparing, identify ones of the input data chunks that correspond to specimen data chunks already present in the data store; and
 to perform deduplication, decide to not store the identified input data chunks as specimen data chunks in the data store.

21. The method according to claim 15, wherein the sparse chunk index includes groups of manifests for corresponding ones of the some specimen data chunks, wherein the identified manifests correspond to one of the groups.

22. The method according to claim 15, further comprising:
 comparing references in a particular one of the identified manifests to references calculated for the input data chunks;
 based on the comparing, identifying ones of the input data chunks that correspond to specimen data chunks already present in the data store; and
 to perform deduplication, deciding to not store the identified input data chunks as specimen data chunks in the data store.

23. The method of claim 17, wherein the sparse chunk index includes groups of manifests for corresponding ones of some specimen data chunks, and wherein the identified manifests correspond to one of the groups.

* * * * *